US008204110B2

(12) United States Patent
Nakaya

(10) Patent No.: US 8,204,110 B2
(45) Date of Patent: *Jun. 19, 2012

(54) METHOD OF CODING AND DECODING IMAGE

(75) Inventor: Yuichiro Nakaya, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/838,871

(22) Filed: Jul. 19, 2010

(65) Prior Publication Data

US 2010/0284463 A1    Nov. 11, 2010

Related U.S. Application Data

(60) Continuation of application No. 11/902,969, filed on Sep. 27, 2007, now Pat. No. 7,817,720, which is a division of application No. 11/147,421, filed on Jun. 8, 2005, now Pat. No. 7,298,781, which is a continuation of application No. 10/714,627, filed on Nov. 18, 2003, now Pat. No. 6,987,810, which is a continuation of application No. 10/262,934, filed on Oct. 3, 2002, now Pat. No. 6,687,302, which is a continuation of application No. 09/987,212, filed on Nov. 13, 2001, now Pat. No. 6,483,877, which is a continuation of application No. 09/694,686, filed on Oct. 24, 2000, now Pat. No. 6,442,205, which is a continuation of application No. 09/438,528, filed on Nov. 12, 1999, now Pat. No. 6,178,202, which is a continuation of application No. 08/819,628, filed on Mar. 17, 1997, now Pat. No. 6,008,852.

(30) Foreign Application Priority Data

Mar. 18, 1996   (JP) .................................... 8-060572

(51) Int. Cl.
H04N 7/12      (2006.01)
H04N 11/02     (2006.01)
H04N 11/04     (2006.01)
H04B 1/66      (2006.01)

(52) U.S. Cl. ................................. 375/240.01
(58) Field of Classification Search ........................ None
See application file for complete search history.

(56) References Cited

U.S. PATENT DOCUMENTS 4,727,506 A    2/1988    Fling
(Continued)

FOREIGN PATENT DOCUMENTS

EP        0632657 A1    1/1995
(Continued)

OTHER PUBLICATIONS

Y. Nakaya et al, "Three Quantization Parameters of Motion Vectors in Motion Compensation," Television Society Technical Reports, vol. 18, No. 80, BCS94-54, pp. 1-8, Dec. 1994, plus partial translation.

(Continued)

*Primary Examiner* — Nhon Diep
(74) *Attorney, Agent, or Firm* — Mattingly & Malur, PC

(57) ABSTRACT

A method of simplifying the arithmetic operation in a global motion compensation process approximates the motion vector field of the whole image without using many parameters. Motion vectors in the global motion compensation are found by the interpolation and/or extrapolation of the motion vectors of a plurality of representative points 602, 603 and 604 having particular features in the spatial distance thereof. Since the shift operation can be substituted for the division for synthesizing a predicted image of global motion compensation, the processing using a computer or a dedicated hardware is simplified.

2 Claims, 16 Drawing Sheets

U.S. PATENT DOCUMENTS

| | | | |
|---|---|---|---|
| 4,924,310 | A | 5/1990 | Brandt |
| 5,329,309 | A | 7/1994 | Dorricott et al. |
| 5,408,269 | A | 4/1995 | Tsukagoshi |
| 5,461,423 | A | 10/1995 | Tsukagoshi |
| 5,617,482 | A | 4/1997 | Brusewitz |
| 5,646,691 | A | 7/1997 | Yokoyama |
| 5,647,049 | A | 7/1997 | Odaka et al. |
| 5,657,087 | A | 8/1997 | Jeong et al. |
| 5,684,538 | A | 11/1997 | Nakaya et al. |
| 5,757,670 | A | 5/1998 | Ti et al. |
| 5,764,807 | A | 6/1998 | Pearlman et al. |
| 5,822,007 | A | 10/1998 | Knee et al. |
| 6,008,852 | A | 12/1999 | Nakaya |
| 6,178,202 | B1 | 1/2001 | Nakaya |
| 6,178,265 | B1 | 1/2001 | Haghighi |

FOREIGN PATENT DOCUMENTS

| | | |
|---|---|---|
| JP | 4-180371 | 6/1992 |
| JP | 6-193970 | 8/1994 |

OTHER PUBLICATIONS

M. Hotter, "Differential Estimation of the Global Motion Parameters Zoom and Pan," Signal Processing, vol. 16, No. 3, pp. 249-265, Mar. 1989.

International Telecommunication Union Standardization Document H. 261, Line Transmission of Non-Telephone Signals, Video Codec for Audio Visual Services at px64kbits, Mar. 1993.

Y. Nakaya et al., "Fast Warping Algorithms for Software Codecs", The Proceedings of the 11th Picture Coding Symposium of Japan (PCS96), Oct. 1996.

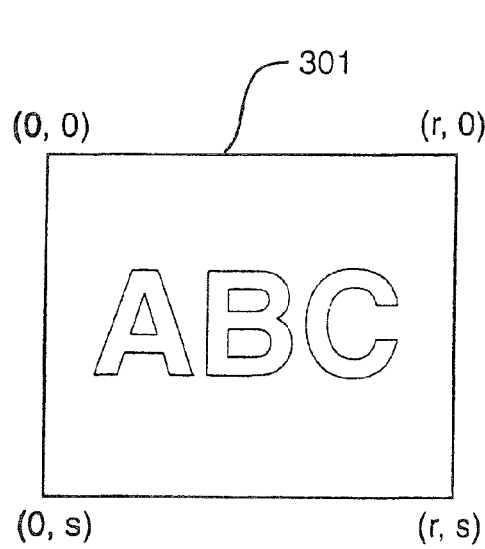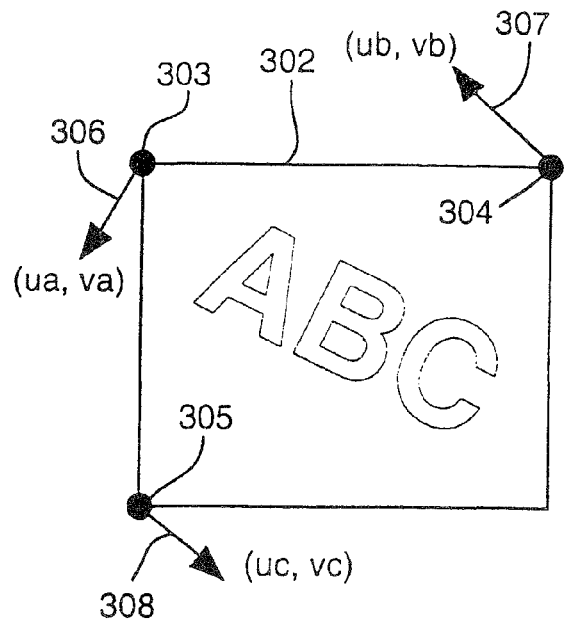
FIG. 3A
FIG. 3B
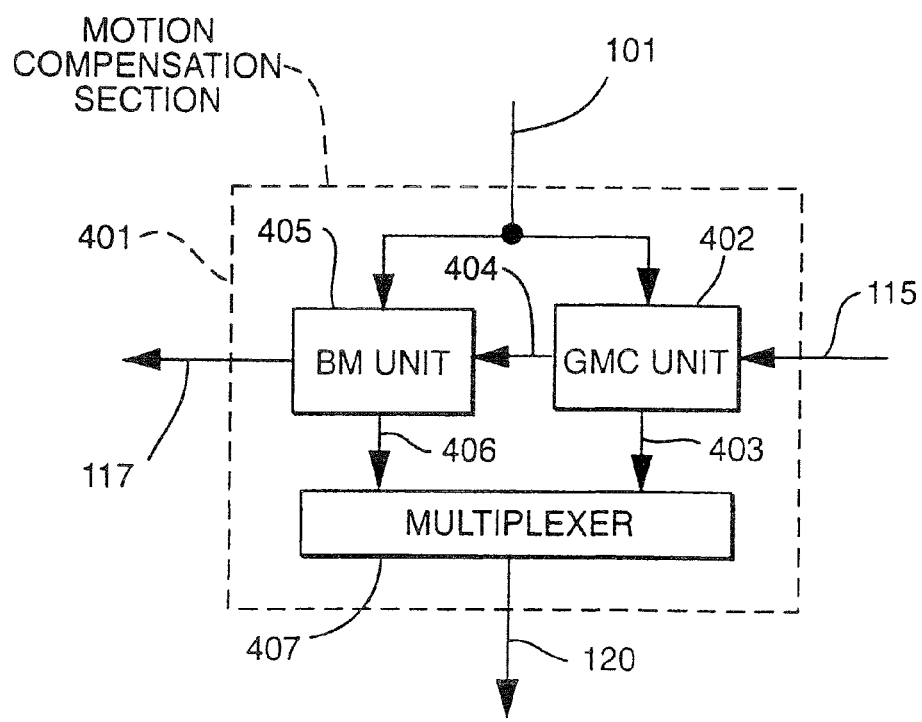
FIG. 4

METHOD OF CODING AND DECODING IMAGE

This is a continuation application of U.S. Ser. No. 11/902,969, filed Sep. 27, 2007, now allowed, which is a continuation application of U.S. Ser. No. 11/147,421, filed Jun. 8, 2005, now U.S. Pat. No. 7,298,781, which is a continuation application of U.S. Ser. No. 10/714,627, filed Nov. 18, 2003, now U.S. Pat. No. 6,987,810, which is a continuation of application of U.S. Ser. No. 10/262,934, filed Oct. 3, 2002, now U.S. Pat. No. 6,687,302, which is a continuation application of U.S. Ser. No. 09/987,212, filed Nov. 13, 2001, now U.S. Pat. No. 6,483,877, which is a continuation application of U.S. Ser. No. 09/694,686, filed Oct. 24, 2000, now U.S. Pat. No. 6,442,205, which is a continuation application of U.S. Ser. No. 09/438,528, filed Nov. 12, 1999, now U.S. Pat. No. 6,178,202, which is a continuation application of U.S. Ser. No. 08/819,628, filed Mar. 17, 1997, now U.S. Pat. No. 6,008,852, from which priority is claimed under 35 U.S.C. §120. This application is related to U.S. Ser. No. 10/262,936, filed Oct. 3, 2002.

FIELD OF THE INVENTION

The present invention relates to a method of coding and decoding an image by applying global motion compensation to the whole image based on linear interpolation and/or extrapolation or bilinear interpolation and/or extrapolation.

BACKGROUND OF THE INVENTION

In the highly efficient coding of a dynamic image, it has been known, in recognition of the similarity of the frames that are close to each other in regard to time, to use motion compensation in compressing the data. The most widely used motion compensation system at present image coding technology is block matching, employed in Standards H.261, MPEG1 and MPEG2 which are international standards for a dynamic image coding system. According to this system, the image to be coded is divided into a number of blocks, and a motion vector is found for each of the blocks.

FIG. 1 illustrates the constitution of a coder 100 of the H.261 Standard which employs a hybrid coding system (adaptive interframe/intraframe coding method) which is a combination of block matching and DCT (discrete cosine transform). A subtractor 102 calculates the difference between an input image (original image of present frame) 101 and an output image 113 (that will be described later) of an interframe/intraframe switching unit 119, and outputs an error image 103. The error image is transformed into a DCT coefficient through a DCT processor 104 and is quantized through a quantizer 105 to obtain a quantized DCT coefficient 106. The quantized DCT coefficient is output as transfer data onto a communication line and is, at the same time, used in the coder to synthesize an interframe predicted image. A procedure for synthesizing the predicted image will be described below. The quantized DCT coefficient 106 passes through a dequantizer 108 and an inverse DCT processor 109 to form a reconstructed error image 110 (the same image as the error image reproduced on the receiving side).

An output image 113 (that will be described later) of the interframe/intraframe switching unit 119 is added thereto through an adder 111, thereby to obtain a reconstructed image 112 of the present frame (the same image as the reconstructed image of the present frame reproduced on the receiving side). The image is temporarily stored in a frame memory 114 and is delayed in time by one frame. At the present moment, therefore, the frame memory 114 is outputting a reconstructed image 115 of the preceding frame. The reconstructed image of the preceding frame and the input image 101 of the present frame are input to a block matching unit 116 where block matching is executed.

In the block matching, an image is divided into a plurality of blocks, and a portion most resembling the original image of the present frame is taken out for each of the blocks from the reconstructed image of the preceding frame, thereby synthesizing a predicted image 117 of the present frame. At this moment, it is necessary to execute a processing (local motion estimation) for detecting how much the blocks have moved from the preceding frame to the present frame. The motion vectors of the blocks detected by the motion estimation are transmitted to the receiving side as motion data 120. From the motion data and the reconstructed image of the preceding frame, the receiving side can synthesize an estimated image which is the same as the one that is obtained independently on the transmitting side.

Referring again to FIG. 1, the estimated image 117 is input together with a "0" signal 118 to the interframe/intraframe switching unit 119. Upon selecting either of the two inputs, the switching unit switches the coding either the interframe coding or the intraframe coding. When the predicted image 117 is selected (FIG. 2 illustrates this case), the interframe coding is executed. When the "0" signal is selected, on the other hand, the input image is directly DCT-coded and is output to the communication line. Therefore, the intraframe coding is executed.

In order to properly obtain the reconstructed image on the receiving side, it becomes necessary to know whether the interframe coding is executed or the intraframe coding is executed on the transmitting side. For this purpose, a distinction flag 121 is output to the communication line. The final H.261 coded bit stream 123 is obtained by multiplexing the quantized DCT coefficient, motion vector, and interframe/intraframe distinction flag into multiplexed data in a multiplexer 122.

FIG. 2 illustrates the constitution of a decoder 200 for receiving a coded bit stream output from the coder of FIG. 1. The H.261 bit stream 217 that is received is separated through a separator 216 into a quantized DCT coefficient 201, a motion vector 202, and an intraframe/interframe distinction flag 203. The quantized DCT coefficient 201 is decoded into an error image 206 through a dequantizer 204 and an inverse DCT processor 205. To the error image is added an output image 215 of an interframe/intraframe switching unit 214 through an adder 207 to form a reconstructed image 208.

The interframe/intraframe switching unit switches the output according to the interframe/intraframe coding distinction flag 203. A predicted image 212 that is used for executing the interframe coding is synthesized by a predicted image synthesizer 211. Here, the decoded image 210 of the preceding frame stored in the frame memory 209 is subjected to a processing of moving the position of each of the blocks according to the motion vector 202 that is received. In the case of intraframe coding, on the other hand, the interframe/intraframe switching unit outputs the "0" signal 213.

Block matching is a motion compensation system that is now most widely utilized. When the whole image is expanding, contracting, or turning, however, the motion vectors of all of the blocks must be transmitted, causing a problem of low coding efficiency. To solve this problem, global motion compensation (e.g., M. Hotter, "Differential Estimation of the Global Motion Parameters Zoom and Pan", Signal Processing, Vol. 16, No. 3, pp. 249-265, March, 1989) has been proposed to express the motion vector field of the whole image while not using many parameters. According to this motion compensation system, the motion vector (ug(x, Y), vg(x, y)) of a pixel (x, y) in an image is expressed in the form of:

$$u_g(x,y)=a_0x+a_1y+a_2$$
$$v_g(x,y)=a_3x+a_4y=a_5 \quad \text{Equation 1}$$

or $$u_g(x,y)=b_0xy+b_1x=b_2y+b_3$$
$$v_g(x,y)=b_4xy+b_5x+b_6y+b_7 \quad \text{Equation 2}$$

and the motion compensation is executed using the motion vectors. In these equations, a0 to a5 and b0 to b7 are motion parameters. In executing the motion compensation, the same predicted image must be generated both on the transmitting side and on the receiving side. For this purpose, the transmitting side may directly transmit values of a0 to a5 or b0 to b7 to the receiving side or may instead transmit motion vectors of several representative points.

As shown in FIG. 3A, assume that the coordinates of the pixels at the left upper, right upper, left lower and right lower corners of an image 301 are expressed by (0, 0), (r, 0), (0, s) and (r, s) (where r and s are positive integers). Here, letting the horizontal and vertical components of the motion vectors of the representative points (0, 0), (r, 0) and (0, s) be (ua, va), (ub, vb) and (uc, vc), respectively, Equation 1 is rewritten as:

$$u_g(x, y) = \frac{u_b - u_a}{r}x + \frac{u_c - u_a}{s}y + u_a \quad \text{Equation 3}$$
$$v_g(x, y) = \frac{v_b - v_a}{r}x + \frac{v_c - v_a}{s}y + v_a$$

This means that the same function can be fulfilled even when ua, va, ub, vb, uc and vc are transmitted instead of transmitting a0 to a5. This state is shown in FIGS. 3A and 3B. The motion vectors 306, 307 and 308 (the motion vectors are defined to start from points of the original image of the present frame and ends at the corresponding points in the reference image) of the representative points 303, 304 and 305 may be transmitted instead of the motion parameters based on the assumption that global motion compensation between the original image 302 of the present frame shown in FIG. 3B and the reference image 301 shown in FIG. 3A is effected. Similarly, by using the horizontal and vertical components (ua, va), (ub, vb), (uc, vc) and (ud, vd) of four representative points (0, 0), (r, 0), (0, s) and (r, s), Equation 2 can be rewritten as:

$$u_g(x, y) = \frac{s-y}{s}\left(\frac{r-x}{r}u_a + \frac{x}{r}u_b\right) + \frac{y}{s}\left(\frac{r-x}{r}u_c + \frac{x}{r}u_d\right) \quad \text{Equation 4}$$
$$= \frac{u_a - u_b - u_c + u_d}{rs}xy +$$
$$\frac{-u_a + u_b}{r}x + \frac{-u_a + u_c}{s}y + u_a$$
$$v_g(x, y) = \frac{v_a - v_b - v_c + v_d}{rs}xy +$$
$$\frac{-v_a + v_b}{r}x + \frac{-v_a + v_c}{s}y + v_a$$

Therefore, a similar function is fulfilled even when ua, va, ub, vb, uc, vc, ud and vd are transmitted instead of b0 to b7. In this specification, the system using Equation 1 is referred to as global motion compensation based upon linear interpolation and/or extrapolation, and the system using Equation 2 is referred to as global motion compensation based upon the bilinear interpolation and/or extrapolation.

FIG. 4 illustrates the constitution of a motion compensation section 401 of an image coder employing the global motion compensation system based upon linear interpolation and/or extrapolation for transmitting motion vectors of the representative points. The same components as those of FIG. 1 are denoted by the same reference numerals. A video coder that executes global motion compensation can be constituted by substituting a motion compensation section 401 for the block matching unit 116 of FIG. 1.

A global motion compensation unit 402 performs motion estimation related to the global motion compensation between the decoded image 115 of the preceding frame and the original image 101 of the present frame, and estimates the values ua, va, ub, vb, uc and vc. The data 403 related to these values are transmitted as part of the motion data 120. A predicted image 404 of global motion compensation is synthesized using Equation 3, and is fed to a block matching unit 405. The motion is compensated by block matching between the predicted image of global motion compensation and the original image of the present frame, thereby generating motion vector data 406 of blocks and a final predicted image 117. The motion vector data and the motion parameter data are multiplexed through a multiplexing unit 407 and are output as motion data 120.

FIG. 5 illustrates the constitution of a motion compensation section 501 which is different from that of FIG. 4. A video coder that executes global motion compensation can be constituted by substituting a motion compensation section 501 for the block matching unit 116 of FIG. 1. In this embodiment, block matching is not adopted for the predicted image of global motion compensation but either global motion compensation or block matching is adopted for each of the blocks. Global motion compensation and block matching are executed in parallel by the global motion compensation unit 502 and the block matching unit 505 between the decoded image 115 of the preceding frame and the original image 101 of the present frame. A selection switch 508 selects an optimum system for each of the blocks between the predicted image 503 of global motion compensation and the predicted image 506 of block matching. The motion vectors 504 of the representative points, motion vectors 507 of the blocks and selection data 509 of global motion compensation/block matching are multiplexed by the multiplexing unit 510 and are output as motion data 120.

By introducing the above-mentioned global motion compensation, it becomes possible to express the general motion of the image using few parameters and to accomplish a high data compression ratio. However, the amounts of coding processing and decoding processing become larger than those of the conventional systems. In particular, the division in Equations 3 and 4 is a major factor of complexity in the processing.

SUMMARY OF THE INVENTION

The global motion compensation in which the motion vector field of the whole image is approximated by a few parameters, involves a problem of increasing the amount of processing involved in synthesizing a predicted image. The object of the present invention is to decrease the amount of the processing by substituting a binary number shift operation for the division in the global motion compensation.

The division is realized by the shift operation by suitably selecting the coordinates of representative points at the time of executing the global motion compensation.

BRIEF DESCRIPTION OF THE DRAWINGS

FIGS. 3A and 3B are diagrams illustrating an example of global motion compensation for transmitting the motion vectors of representative points.

FIG. 4 is a diagram illustrating a motion compensation section of the video decoder for effecting the block matching of a predicted image of global motion compensation.

DETAILED DESCRIPTION OF THE PREFERRED EMBODIMENTS

In the following description, the sampling intervals for the pixels are 1 in both the horizontal and vertical directions, and the coordinates of the pixels at the left upper, right upper, left lower and right lower corners are expressed by $(0, 0)$, $(r, 0)$, $(0, s)$ and $(r, s)$ (where r and s are positive integers), respectively, as shown in FIG. 3A.

If the motion vector is quantized for each of the pixels in compensating the motion based upon the linear interpolation and/or extrapolation (affine transform) or the bilinear interpolation and/or extrapolation (bilinear transform), mismatching can be prevented and the operation can be simplified (Japanese Patent Application No. 193970/1994). In the following description, it is assumed that the horizontal component and vertical component of a motion vector of a pixel are integral multiples of $1/m$ (where m is a positive integer). Further, it is assumed that the global motion compensation is executed using the motion vectors of representative points explained in the "Prior Art" and that the motion vectors of the representative points are integral multiple of $1/k$ (where k is a positive integer). In this specification, the "motion vectors of pixels" are the motion vectors that are actually used for synthesizing a predicted image. On the other hand, the "motion vectors of representative points" are the parameters used for calculating the motion vectors of pixels. Because of the difference in the quantization step sizes, therefore, the motion vectors of pixels often may not be in agreement with the motion vectors of representative points even though they have the same coordinates.

Figure 6:
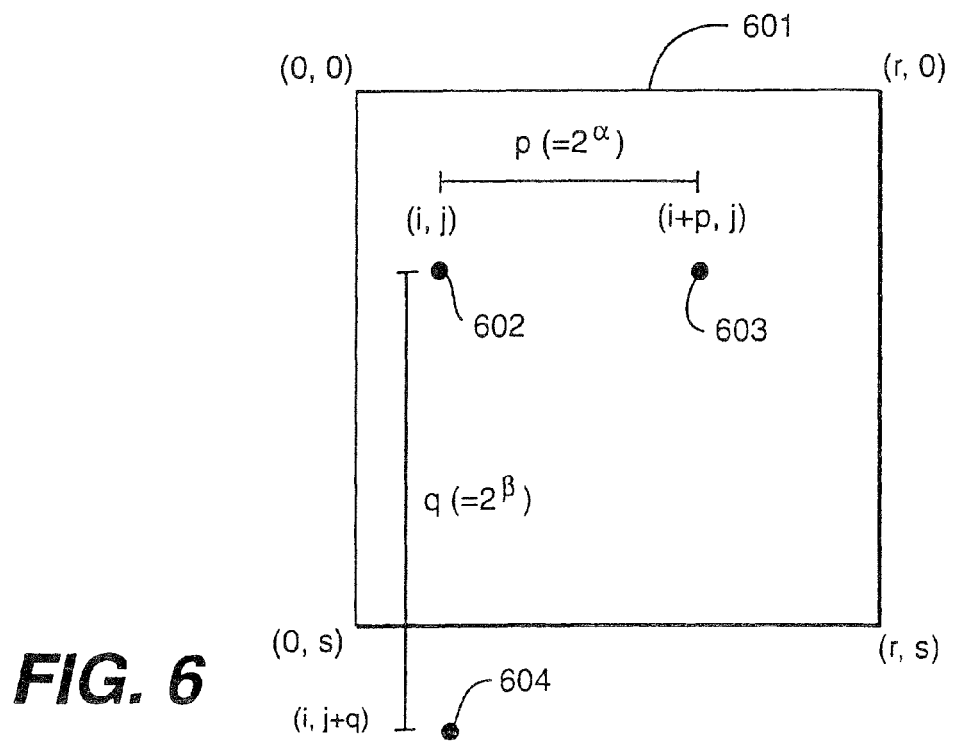
FIG. 6 is a diagram illustrating the arrangement of representative points for executing high-speed processing.

With reference to FIG. 6, a case based upon linear interpolation and/or extrapolation will be explained. Here, as described in the "Prior Art", the representative points are not those located at the corners of the image 601, but are the points 602, 603 and 604 having the coordinates $(i, j)$, $(i+p, j)$ and $(i, j+q)$ (i, j, p and q are integers), respectively. At this moment, the points 602, 603 and 604 may exist inside or outside the image. Letting the coordinates whose values are given by multiplying the horizontal and vertical components of the motion vectors of the representative points by k be respectively $(u0, v0)$, $(u1, v1)$ and $(u2, v2)$ (u0, v0, u1, v1, u2 and v2 are integers), coordinates $(u(x, y)$ and $v(x, y)$ (where x, y, u(x, y) and v(x, y) are integers) which are m times the horizontal and vertical components of the motion vector of a pixel $(x, y)$ are expressed by the following equations:

$$u(x,y)=(((u1-u0)(x-i)q+(u2-u0)(y-j)p+u0pq)m)//(pqk)$$

$$v(x,y)=(((v1-v0)(x-i)q+(v2-v0)(y-j)p+v0pq)m)//(pqk) \quad \text{Equation 5}$$

where "//" represents division for rounding the quotient of ordinary division into an adjacent integer when the quotient is not an integer, and its priority as an operator is the same as that of multiplication and division. To decrease the operation error, it is desirable that a value which is not an integer is rounded to the most adjacent integer. In this case, the methods for rounding a value of the sum of an integer and ½ are:

(1) Rounding the value toward 0;
(2) Rounding the value away from 0;
(3) Rounding the value toward 0 when the dividend is negative, and rounding the value away from 0 when the dividend is positive (assuming that the divisor is positive at all times); and
(4) Rounding the value away from 0 when the dividend is negative, and rounding the value toward 0 when the dividend is positive (assuming that the divisor is positive at all times).

Among them, (3) and (4) are advantageous from the standpoint of processing quantity since the rounding direction does not change irrespective of whether the dividend is positive or negative and there is no need to judge whether the sign is positive or negative. High-speed processing according to method (3) can be realized by the following equation:

$$u(x,y)=(Lpqk+((u1-u0)(x-i)q+(u2-u0)(y-j)p+u0pq)$$
$$m+(pqk\#2))\#(pqk)-L$$

$$v(x,y)=(Mpqk+((v1-v0)(x-i)q+(v2-v0)(y-j)p+v0pq)$$
$$m+(pqk\#2))\#(pqk)-M \qquad \text{Equation 6}$$

where "#" represents division of an integer for rounding off the decimal part toward 0, which is, usually, most easily realized using a computer. L and M are sufficiently large positive integers for maintaining the dividend of division to be positive at all times. The term (pqk#2) is used for rounding the quotient of division to the most adjacent integer.

Integer processing contributes to decreasing the amount of processing. Here, assuming that p, q and k are $2^\alpha$, $2^\beta$ and $2^{h0}$, respectively wherein $\alpha$ and $\beta$ are positive integers, and h0 is an integer which is not negative. The division of Equation 5 can be realized by the shift operation of $\alpha+\beta+h0$ bits, making it possible to greatly decrease the amount of processing using a computer or dedicated hardware. Furthermore, assuming that m is $2^{h1}$ (h1 is an integer which is not negative, and $h1<\alpha+\beta+h0$), Equation 6 can be rewritten as:

$$u(x, y) = ((2L + 1) << (\alpha + \beta + h0 - h1 - 1) + (u1 - u0)$$
$$(x - i) << \beta + (u2 - u0)$$
$$(y - j) << \alpha + u0 << (\alpha+\beta)) >>$$
$$(\alpha + \beta + h0 - h1) - L$$
$$v(x, y) = ((2M + 1) << (\alpha + \beta + h0 - h1 - 1) +$$
$$(v1 - v0)(x - i) << \beta + (v2 - v0)(y - j)$$
$$<< \alpha + v0 << (\alpha+\beta)) >> (\alpha + \beta + h0 - h1) - M$$
$$\text{Equation 7}$$

where "$x<<\alpha$" means that x is shifted left by a bits and 0 is substituted for the low-order a bits, "$x>>\alpha$" means that x is shifted right by $\alpha$ bits and 0 or 1 is substituted for the high-order a bits (when x is a number of complement representation of 2, 1 is substituted when the most significant bit of x is 1 and 0 is substituted when it is 0), and the priority of these operators lies between addition/subtraction and multiplication/division, making it possible to further simplify the operation.

When the linear interpolation and/or extrapolation is used, letting (u3, v3) be the coordinates determined by multiplying the horizontal and vertical components of a motion vector of a representative point at (i+p, j+q) by k, Equation 5 is rewritten as Equation 8 or Equation 9, as follows:

$$u(x,y)=(((u1-u0)(x-i)q+(u3-u1)(y-j)p+u0pq)m)//$$
$$(pqk)$$

$$v(x,y)=(((v1-v0)(x-i)q+(v3-v1)(y-j)p+v0pq)m)//(pqk) \qquad \text{Equation 8}$$

where the representative points are:
(i, j), (i+p, j) and (i+p, j+q).

$$u(x,y)=(((u3-u2)(x-i)q+(u2-u0)(y-j)p+u0pq)m)//$$
$$(pqk)$$

$$v(x,y)=(((v3-v2)(x-i)q+(v2-v0)(y-j)p+v0pq)m)//(pqk) \qquad \text{Equation 9}$$

where the representative points are:
(i, j), (i, j+q) and (i+p, j+q),
or $$u(x,y)=(((u2-u3)(i+p-x)q+(u1-u3)(j+q-y)p+u3pq)$$
$$m)//(pqk)$$

$$v(x,y)=(((v2-v3)(i+p-x)q+(v1-v3)(j+q-y)p+v3pq)m)//$$
$$(pqk) \qquad \text{Equation 10}$$

where the representative points are: (i+p, j), (i, j+q) and (i+p, j+q),
making it possible to decrease the amount of processing by using p, q, k and m which are numbers of $2^n$ (where n is a positive integer).

When the bilinear interpolation and/or extrapolation are used, letting (u0, v0), (u1, v1), (u2, v2) and (u3, v3) be the coordinates determined by multiplying the horizontal and vertical components of the motion vectors of the representative points (i, j), (i+p, j), (i, j+q) and (i+p, j+q) by k, u(x, y) and v(x, y) are represented by the following equation:

$$u(x,y)=(((j+q-y)((i+p-x)u0+(x-i)u1)+(y-j)((i+p-x)$$
$$u2+(x-i)u3))m)//(pqk)$$

$$v(x,y)=(((j+q-y)((i+p-x)v0+(x-i)v1)+(y-j)((i+p-x)v2+$$
$$(x-i)v3))m)//(pqk) \qquad \text{Equation 11}$$

Equation 11 can be rewritten as:

$$u(x,y)=((2L+1)<<(\alpha+\beta+h0-h1-1)+(j+q-y)((i+p-x)$$
$$u0+(x-i)u1)+(y-j)((i+p-x)u2+(x-i)u3))>>(\alpha+\beta+$$
$$h0-h1)-L$$

$$v(x,y)=((2M+1)<<(\alpha+\beta+h0-h1-1)+(j+q-y)((i+p-x)$$
$$v0+(x-i)v1)+(y-j)((i+p-x)v2+(x-i)v3))>>(\alpha+\beta+$$
$$h0-h1)-M \qquad \text{Equation 12}$$

by using p, q, k and m which are numbers of $2^\alpha$, $2^\beta$, $2^{h0}$, and $2^{h1}$, respectively, making it possible to decrease the amount of processing as in the above-mentioned processing.

In order to obtain the same predicted image of global motion compensation on the transmitting side and on the receiving side, the data related to the motion vectors of the representative points must be transmitted in a certain form to the receiving side. The motion vectors of the representative points may be directly transmitted. It is, however, also possible to transmit the motion vectors of the corner points of the image and to calculate the motion vectors of the representative points therefrom. This method will now be described.

First a case where the linear interpolation and/or extrapolation is employed will be described. It is assumed that the motion vectors of three corner points (0, 0), (r, 0) and (0, s) of the image take only those values which are integral multiples of 1/n, and that the coordinates (u00, v00), (u01, v01) and (u02, v02) which are determined by multiplying the horizontal and vertical components by n are transmitted. In this case, the coordinates (u0, v0), (u1, v1), (u2, v2) and (u3, v3) which are determined by multiplying the horizontal and vertical components of the motion vectors by k are defined as follows:

$$u0=u'(i,j)$$

$$v0=v'(i,j)$$

$$u1=u'(i+p,j)$$

$$v1=v'(i+p,j)$$

$$u2=u'(i,j+q)$$

$$v2=v'(i,j+q)$$

$$u3=u'(i+p,j+q)$$

$$v3=v'(i+p,j+q) \qquad \text{Equation 13}$$

where u'(x, y) and v'(x, y) are defined by the following equation, which is a modification of Equation 5:

$$u'(x,y)=(((u01-u00)xs+(u02-u00)yr+u00rs)k)///(rsn)$$

$$v'(x,y)=(((v01-v00)xs+(v02-v00)yr+v00rs)k)///(rsn) \qquad \text{Equation 14}$$

Here, "///" represents division for rounding the quotient of an ordinary division into an adjacent integer when the quotient is not an integer, and its priority as an operator is the same as that of multiplication and division. Three points are selected out of (u0, v0), (u1, v1), (u2, v2) and (u3, v3), and the global motion compensation is executed using such points as representative points. Then, the global motion compensation can be approximated by using (0, 0), (r, 0) and (0, s) as the representative points. Here, by using p and q which are $2^n$ (n is positive integer), the processing can be simplified as described earlier. In order to decrease the operation errors, it is desirable that "///" rounds a value which is not an integer into the most adjacent integer. In this case, methods for rounding a value of the sum of an integer and ½ include the above-mentioned methods (1) to (4). Compared to the case using Equation 5 (calculation for each pixel), however, the operation of Equation 14 (only three calculations for one image) does not require many calculations. Even if methods (1) or (2) are selected, therefore, the total amount of calculation is not greatly affected.

When three points different from those of the case using Equation 13 are selected as corner points of the image, the same processing can be realized by modifying Equations 8 to 10. In addition to the above-mentioned examples, by letting (u03, v03) be the coordinates determined by multiplying the horizontal and vertical components of a motion vector at a corner point (r, s) of the image by n, Equation 14 can be rewritten as:

$$u'(x,y)=(((u01-u00)xs+(u03-u01)yr+u00rs)k)///(rsn)$$

$$v'(x,y)=(((v01-v00)xs+(v03-v01)yr+v00rs)k)///(rsn) \quad \text{Equation 15}$$

when (u00, v00), (u01, v01) and (u03, v03) are transmitted; can be rewritten as:

$$u'(x,y)=(((u03-u02)xs+(u02-u00)yr+u00rs)k)///(rsn)$$

$$v'(x,y)=(((v03-v02)xs+(v02-v00)yr+v00rs)k)///(rsn) \quad \text{Equation 16}$$

when (u00, v00), (u02, v02) and (u03, v03) are transmitted; and can be rewritten as:

$$u'(x,y)=(((u02-u03)(r-x)s+(u01-u03)(s-y)r+u03rs)k)///(rsn)$$

$$v'(x,y)=(((v02-v03)(r-x)s+(v01-v03)(s-y)r+v03rs)k)///(rsn) \quad \text{Equation 17}$$

when (u01, v01), (u02, v02) and (u03, v03) are transmitted.

The same also holds even when the bilinear interpolation and/or extrapolation are executed. As in the above-mentioned case, assume that the motion vectors of the four corner representative points (0, 0), (r, 0), (0, s) and (r, s) of the image take only those values which are integral multiples of 1/n, and that (u00, v00), (u01, v01), (u02, v02) and (u03, v03) which are n times the horizontal and vertical components of the representative points are transmitted. In this case, (u0, v0), (u1, v1), (u2, v2) and (u3, v3) which are k times the horizontal and vertical components of the motion vectors of the representative points (i, j), (i+p, j), (i, j+q) and (i+p, j+q) are given by Equation 13 as described above. Here, however, by modifying Equation 11,
u'(x, y) and v'(x, y) are defined by:

$$u'(x,y)=(((s-y)((r-x)u00+xu01)+y((r-x)u02+xu03))k)///(rsn)$$

$$v'(x,y)=(((s-y)((r-x)v00+xv01)+y((r-x)v02+xv03))k)///(rsn) \quad \text{Equation 18}$$

The advantage of the method in which the motion vectors of corner points of the image are transmitted and are interpolated and/or extrapolated to find motion vectors of representative points, is that the ranges of the motion vector for each of the pixels can be easily limited. For example, in the case of the bilinear interpolation and/or extrapolation given by Equation 4, the value ug(x, y) is not greater than the maximum value of ua, ub, uc and ud and not smaller than the minimum value thereof when the point (x, y) is inside the image. Therefore, if a limiting condition is added so that the values ua, ub, uc and ud lie within a limited range (e.g., range within ±32 pixels) at the time of estimating the global motion, the value ug(x, y) can be confined within the same range for all pixels (this also holds even for vg(x, y), as a matter of course). This makes it possible to definitely determine the number of digits necessary for the calculation, which is convenient from the standpoint of designing software or hardware.

The foregoing description, however, is based upon the case that the calculations are all carried out based upon using floating-point arithmetic operations and, hence, care must be given in practice. The arithmetic operation (Equation 18) for finding the motion vectors of representative points from the motion vectors of corner points of the image involves rounding a value into an integer. Therefore, consideration must be taken to the probability that the motion vectors found by Equation 12 may deviate out of the above-mentioned limited range due to the calculation error. In particular, care must be taken when the representative points are located inside the image. This is because, the motion vectors are found by the extrapolation for the pixels outside a rectangle defined by representative points and, hence, the rounding error may be amplified.

Figure 7:
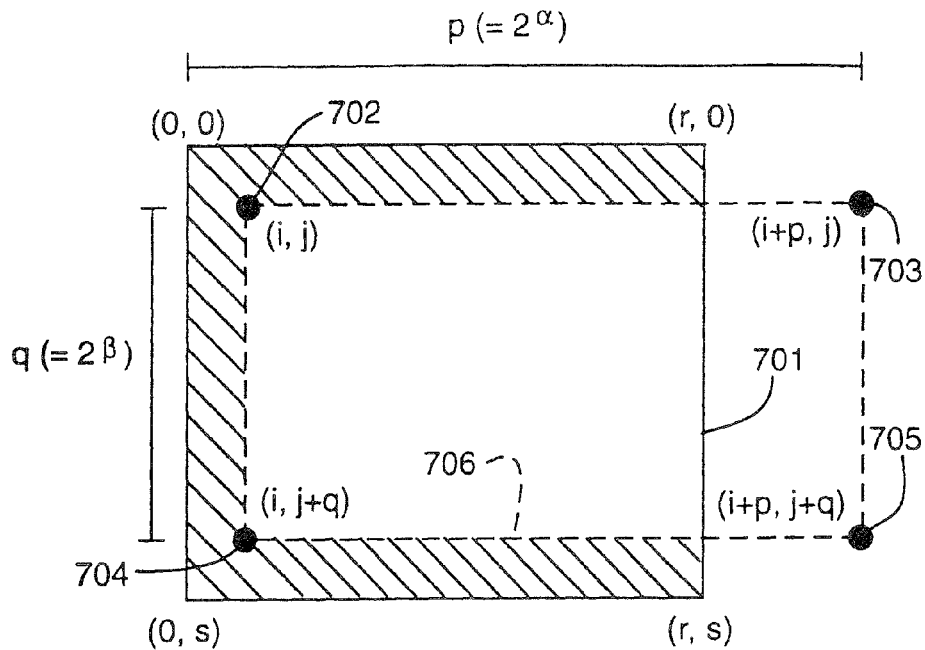
FIG. 7 is a diagram illustrating a region for finding the motion vectors by extrapolation within the image.

FIG. 7 illustrates an example in which the motion vectors are found by extrapolation. When the global motion compensation is executed for the image 701 by using representative points 702, 703, 704 and 705, the motion vectors are calculated by the extrapolation for the hatched portions inside the image. This is because, the hatched portions exist outside a rectangle 706 defined by the representative points.

Figure 8:
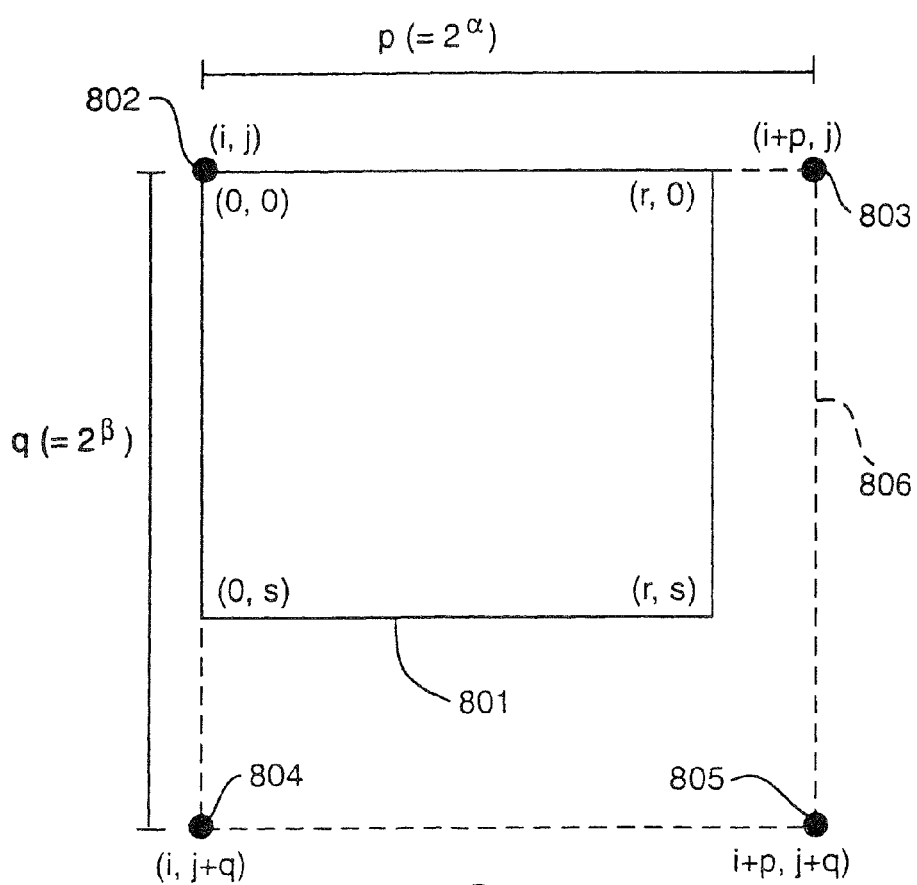
FIG. 8 is a diagram illustrating an example which the motion vectors of all pixels in the image are found by interpolation from the motion vectors of the representative points.

This problem can be effectively solved by so arranging the four representative points that a rectangle defined by the representative points includes the whole image. This is shown in FIG. 8. A rectangle 806 defined by representative points 802, 803, 804 and 805 includes an image 801. Then the motion vectors of all pixels can be found by the interpolation from the representative points, and the effect of the rounding error at the representative points is not amplified inside the image. Accordingly, an error larger than the rounding error at representative points never occurs inside the image, and the upper limit of error is definite. When the rectangle defined by the representative points is too large, however, the range of values that the motion vectors of representative points take is so wide that a number of digits necessary for the arithmetic operation increases, causing a disadvantage from the standpoint of mounting.

From the foregoing description, it is desirable that the value p is larger than r and the value q is larger than s in order to decrease the effect of the rounding error. It is also desirable that p and q assume values that are as large as possible even when they are smaller than r and s. It is further desirable that the values i and j are such that a portion which is as wide as possible inside the image is in an area that is defined by the representative points.

Figure 9:
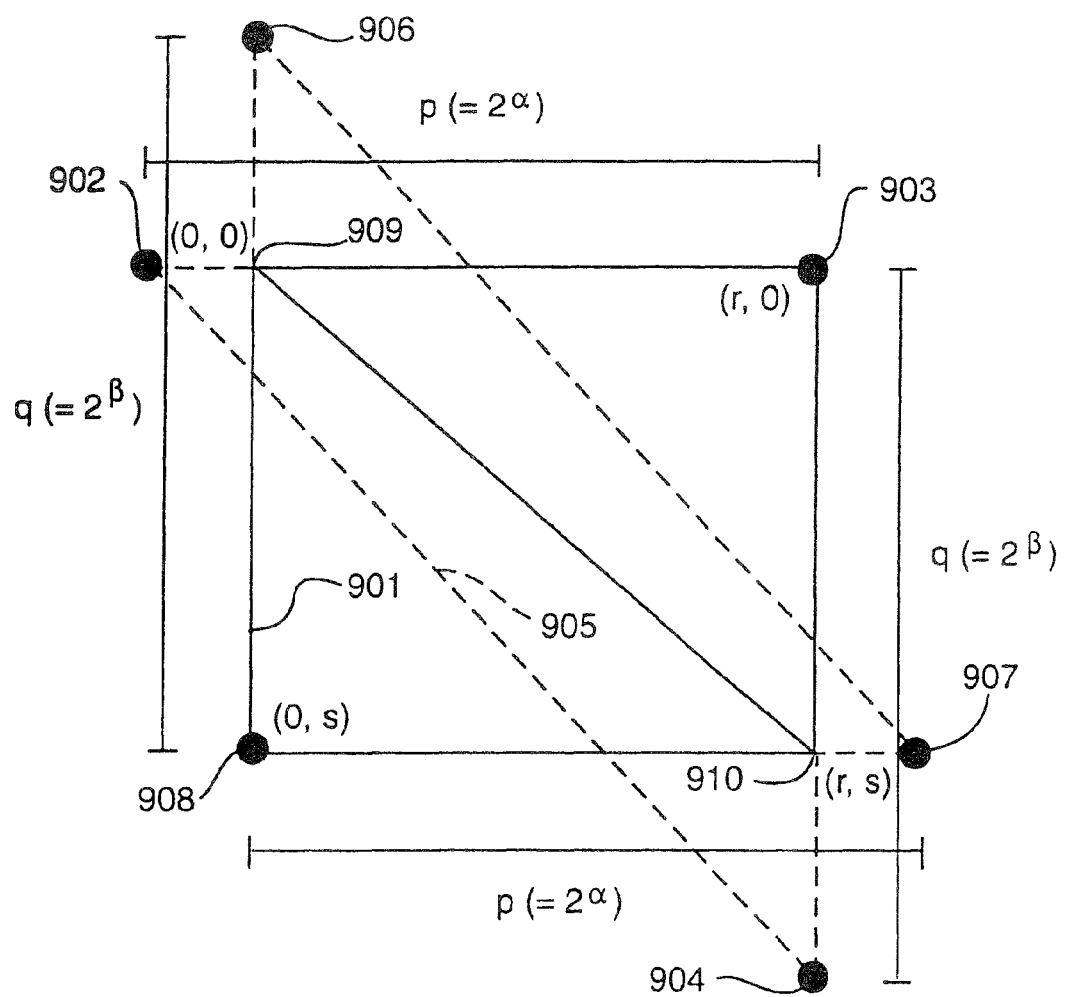
FIG. 9 is a diagram in which the image is divided into two right triangles, and the global motion compensation is executed for each of them based on interpolation from the motion vectors of the representative points.

When the bilinear interpolation and/or extrapolation are used for the global motion compensation as described above, the components of motion vectors of pixels in the rectangle defined by the two representative points can take only values that lie between maximum values and minimum values of the components of the motion vectors of the representative points. When linear interpolation and/or extrapolation is used, on the other hand, the motion vectors of pixels in a triangle defined by three representative points have the same property. When the global motion compensation is executed by using the linear interpolation and/or extrapolation, therefore, it is effective to transmit the motion vectors of the four corner points of the image and to carry out the global motion compensation independently for the two right triangles divided by a diagonal of the image. Then, the limitation on the range of the motion vectors of the four corner points can be directly applied to the motion vectors of all pixels inside the image. In this case, the values i, j, p and q may not be the same between the two right triangles. From the standpoint of operation error, furthermore, it is desirable that triangles defined by the representative points include right triangles of which the global motion compensation is to be executed, respectively, in order to avoid the calculation of motion vectors of pixels by the extrapolation. This is shown in FIG. 9. The motion vectors of points 909, 903, 908 and 910 which are the four corners of an image 901 are transmitted, and the global motion compensation is independently executed for each of a right triangle defined by the points 909, 903 and 910 and a right triangle defined by the points 909, 910 and 908. Therefore, if a limitation is imposed on the range of motion vectors of vertexes, the motion vectors of all pixels within the image are included in this limited range. The right triangle defined by the points 909, 903 and 910 uses points 902, 903 and 904 as representative points, and the right triangle defined by the points 909, 910 and 908 uses points 906, 907 and 908 as representative points. The triangles defined by the representative points include therein right triangles to which the global motion compensation is to be executed, respectively. Therefore, the effect of the rounding error of the motion vectors of representative points is not amplified at points inside the image. In this example, the two triangles defined by the representative points are similar to each other. However, the triangles may not necessarily be similar to each other.

The present invention makes it possible to substitute the shift operation for the division for synthesizing a predicted image of global motion compensation, and to simplify the processing using either software or dedicated hardware or a combination of both.

Figure 10:
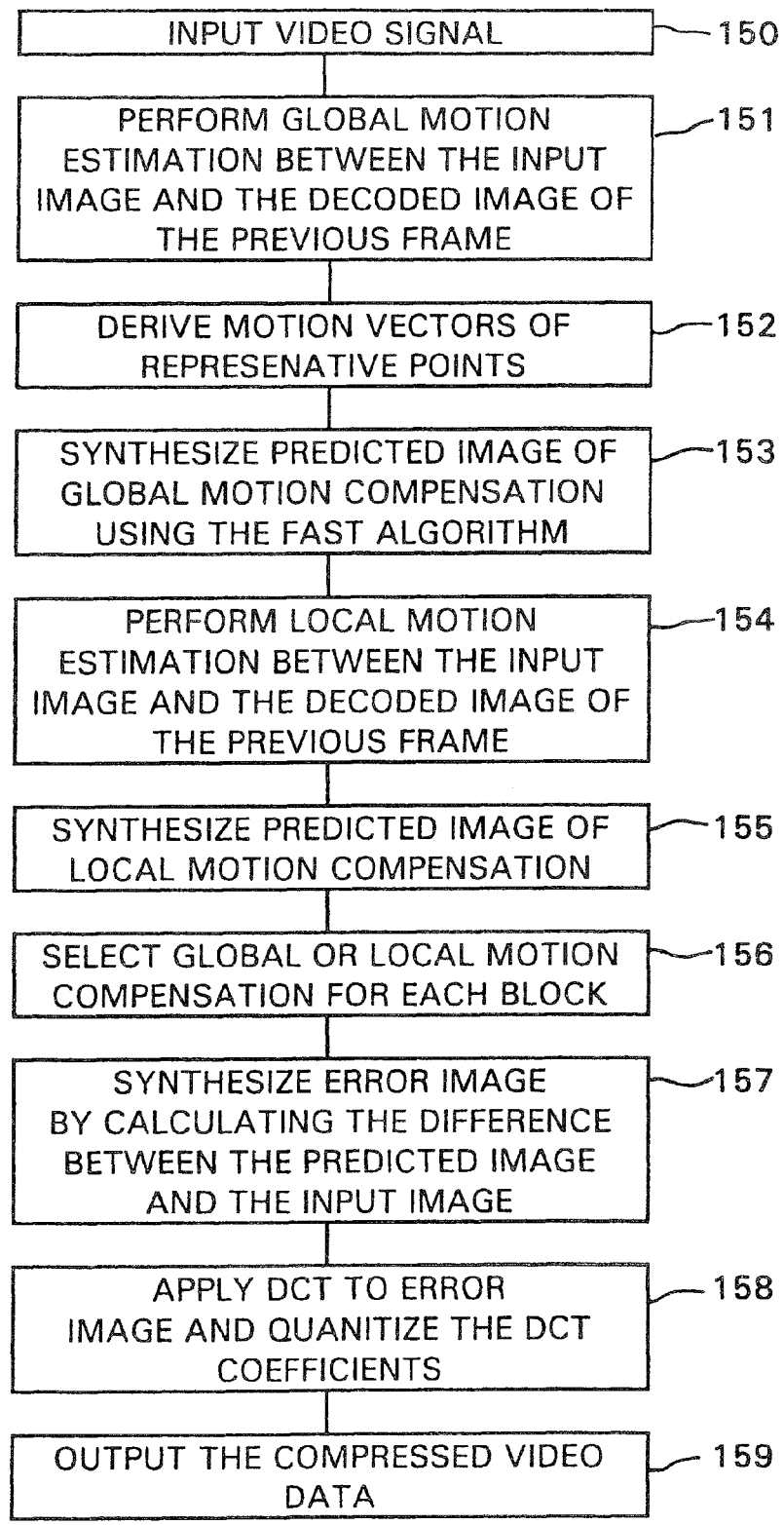
FIG. 10 shows a flow chart for performing video coding according to an embodiment of the invention.

FIG. 10 shows the steps followed in performing video coding of video image data using fast global motion compensation according t0 an embodiment of the present invention. In step 150, a video signal is input and in step 151, global motion estimation is performed between an input image and the decoded image of a previous frame. Then, the motion vectors are derived from the representative points of the input image in step 152.

In the next step, step 153, a predicted image of global motion compensation is synthesized using the fast algorithm. The fast algorithm is a general expression for algorithms disclosed herein, such as the bilinear algorithm and affine algorithm. For example, equation 1 is an affine algorithm whereas equation 2 is a bilinear algorithm. Further, equations 3, 5, 6, 7-10, and 14-17 are affine whereas equations 4, 11 and 18 are bilinear.

In step 154, the local motion estimation is performed between the input image and the decoded image of the previous frame. The predicted image of local motion compensation is synthesized in step 155 and the global or local motion compensation for each block is selected in step 156. The selection step is necessary since the global motion compensation and local motion compensation steps are performed in parallel in this embodiment.

Then, in step 157, the error image is synthesized by calculating the difference between the predicted image and the input image and the error image is subject to a discrete cosine transform for quantizing the DCT coefficients in step 158. Finally, in step 159, the compressed video data is output.

Figure 11:
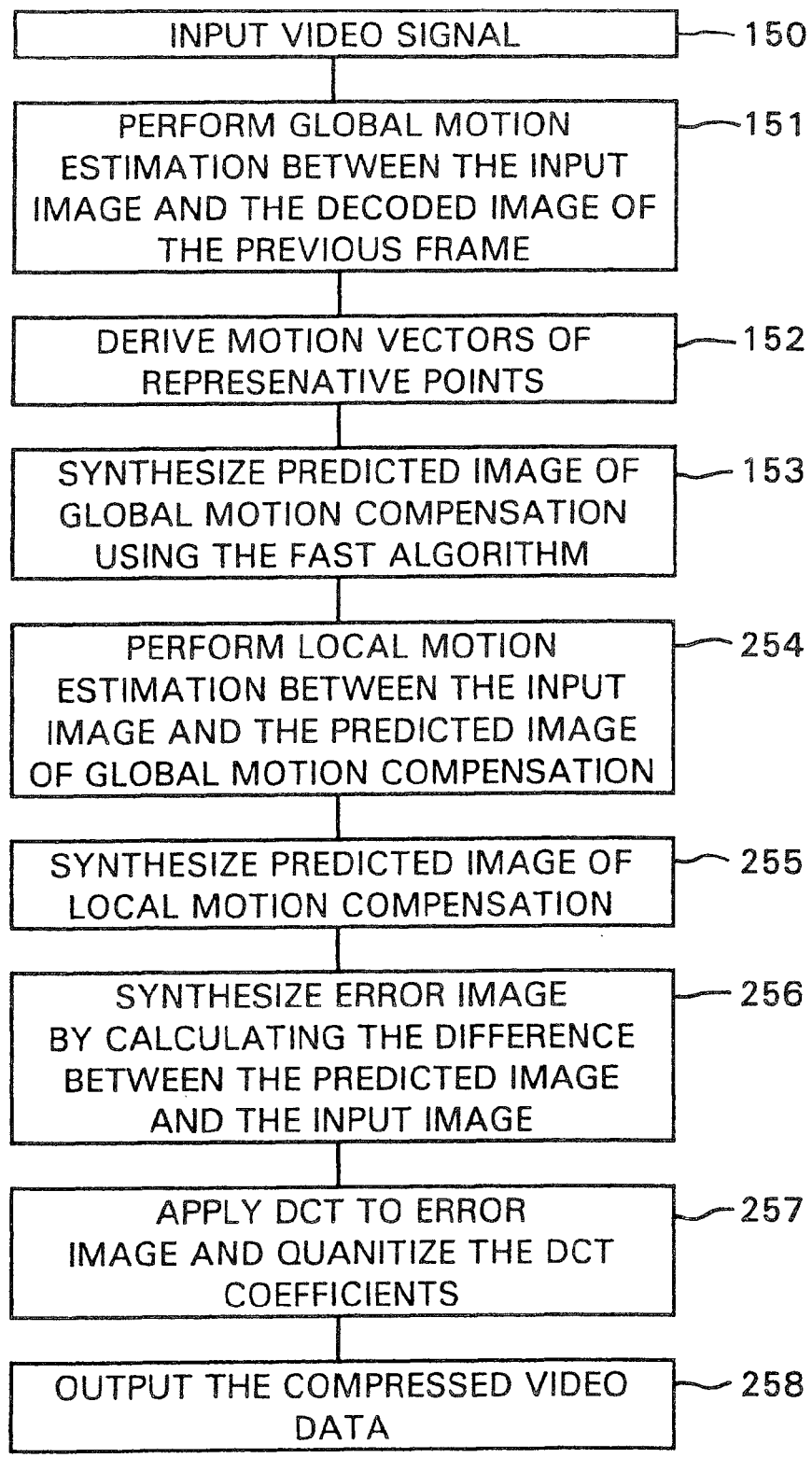
FIG. 11 shows a flow chart for performing video coding according to another embodiment of the invention.

In FIG. 11, an alternative embodiment is disclosed for performing video coding, which is similar to the video coding disclosed in FIG. 10. Specifically, steps 150-153 are the same, but the remainder of the steps shown in the flow chart are different. The reason for this is that the steps performed in FIG. 11 are for performing the local motion compensation and global motion compensation serially, rather than in parallel as in FIG. 10. Accordingly, in step 254, local motion estimation is performed between the input image and the predicted image of global motion compensation. Then, in step 255, the predicted image of local motion compensation is synthesized. Finally, the error image is synthesized by calculating the difference between the predicted image and the input image, just as in step 157 in FIG. 10, and steps 257 and 258 are the same as steps 158 and 159, explained above.

Figure 12:
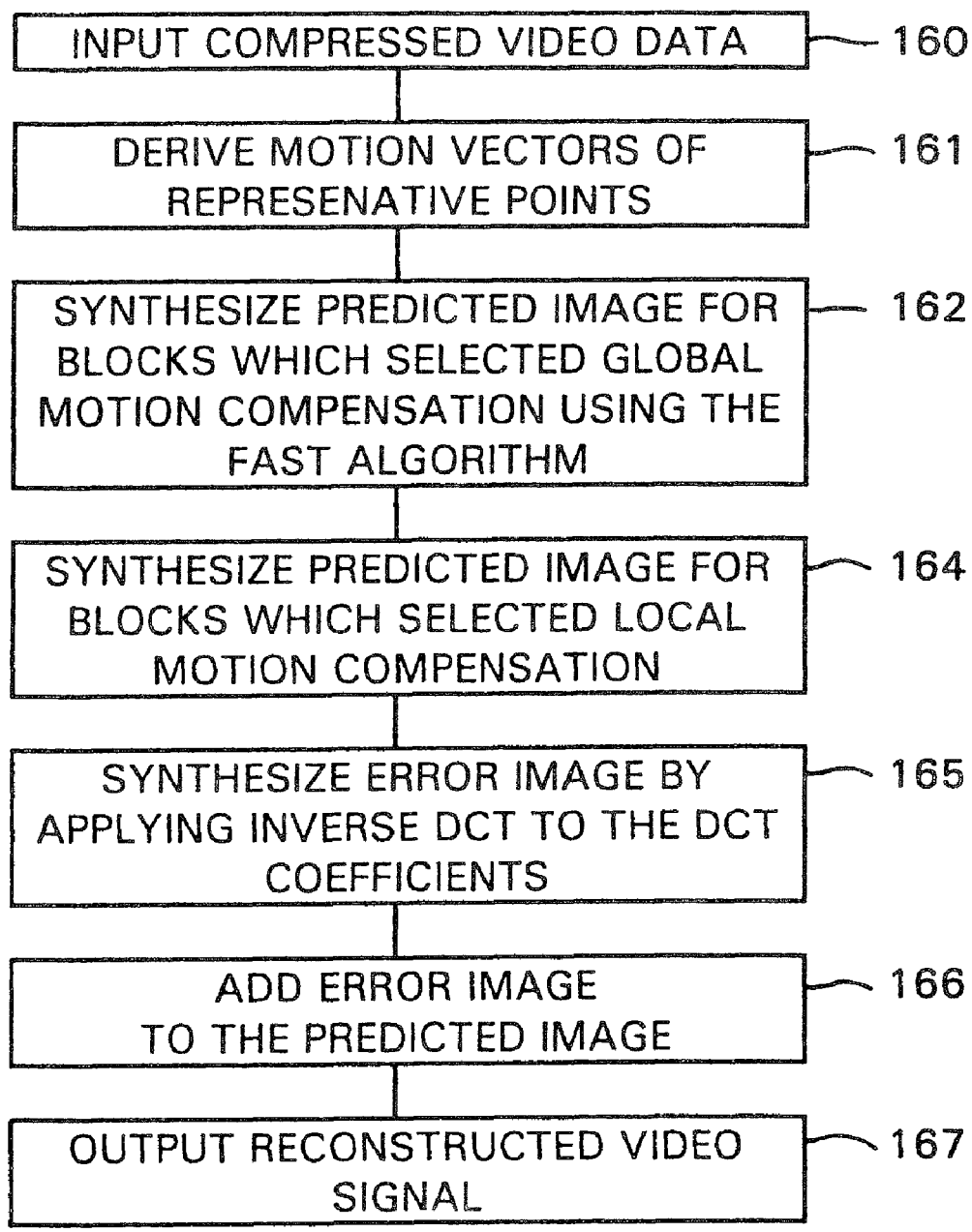
FIG. 12 shows a flow chart for video decoding according to an embodiment of the invention.

FIG. 12 shows a flow chart of the video decoding according to the present invention. In step 160, an input bit stream, such as a h.261 bit stream is received as the compressed video data. The motion vectors of the representative points are derived and in step 161 and in step 162, the predicted image for blocks which selected global motion compensation using the fast algorithm are selected. In step 164, the predicted image for blocks which selected local motion compensation are synthesized. The error image with respect to the predicted image is synthesized in step 165 and the error image is added to the predicted image in 166. In step 167, the reconstructed video signal is output to complete the decoding of the encoded video data.

According to the embodiment of FIG. 12, the synthesizing of the predicted image for blocks which selected global motion compensation using the fast algorithm and also for blocks which selected local motion compensation is performed in parallel. On the other hand, in FIG. 13, the flow chart shows an alternative embodiment in which these steps are performed serially.

Figure 13:
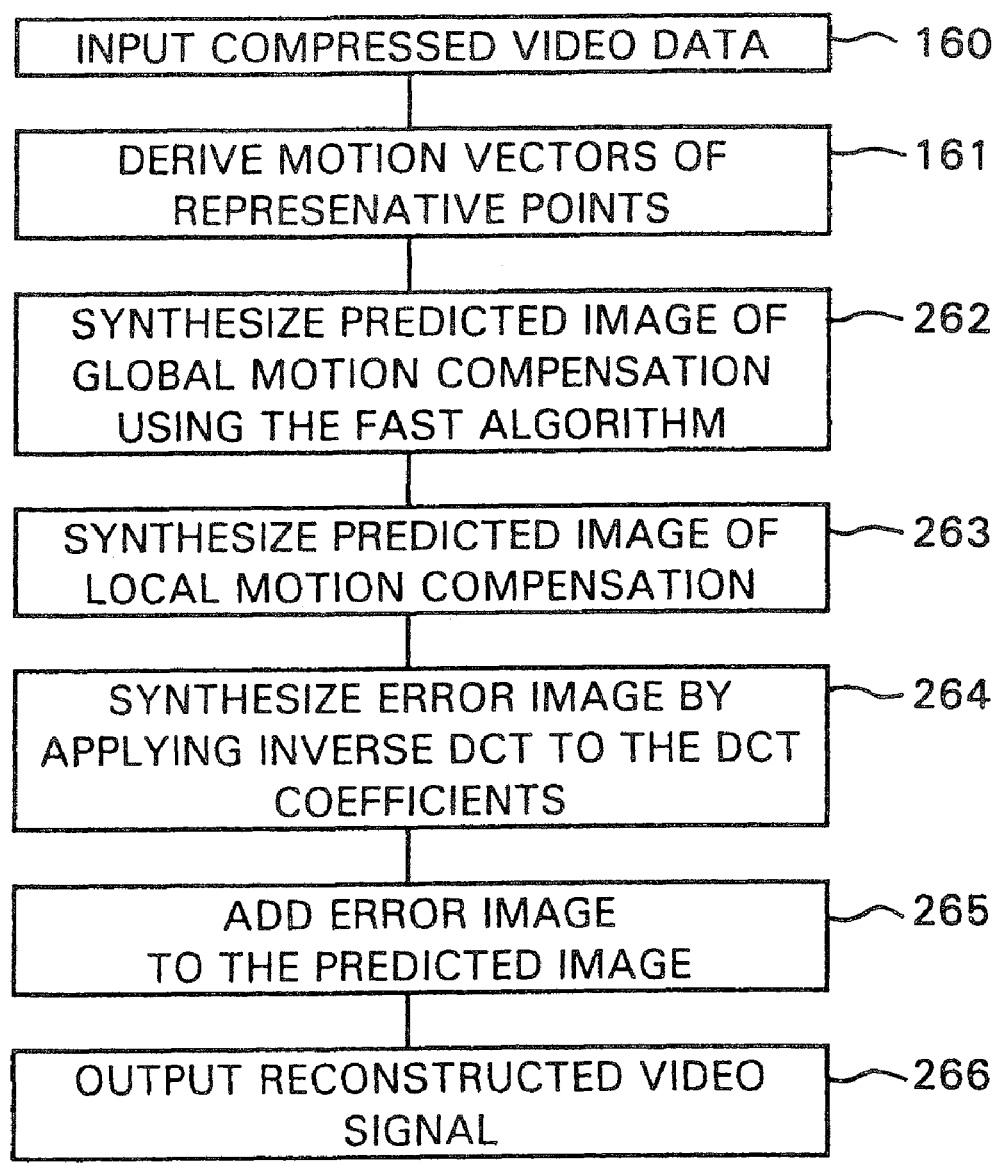
FIG. 13 shows a flow chart for video decoding according to another embodiment of the invention.

In FIG. 13, steps 160 and 161 are the same as those in FIG. 12. In step 262, the predicted image of global motion compensation using the fast algorithm is synthesized and in step 263 the predicted image of local motion compensation is synthesized. These steps are performed serially and followed by the step of synthesizing the error image by applying inverse DCT to the DCT coefficients, which is the same as step 165 in FIG. 12. Steps 265 and 266 which follow are also the same as steps 166 and 167 discussed with respect to FIG. 12, and which result in the output of the reconstructed video signal.

Figure 14:
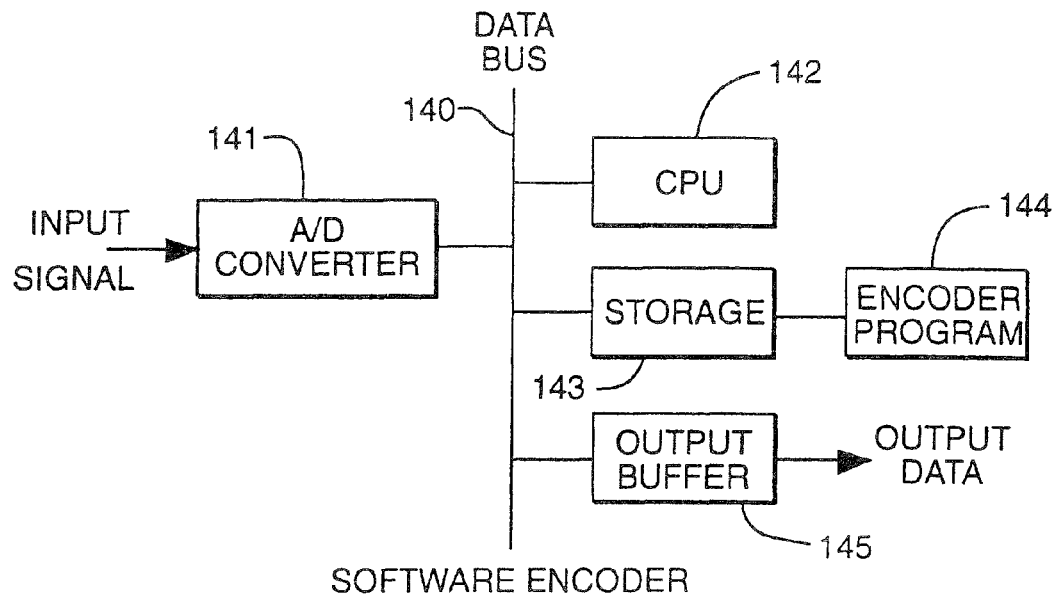
FIG. 14 is a diagram of a software encoder for a video coding method according to an embodiment of the invention.
Figure 15:
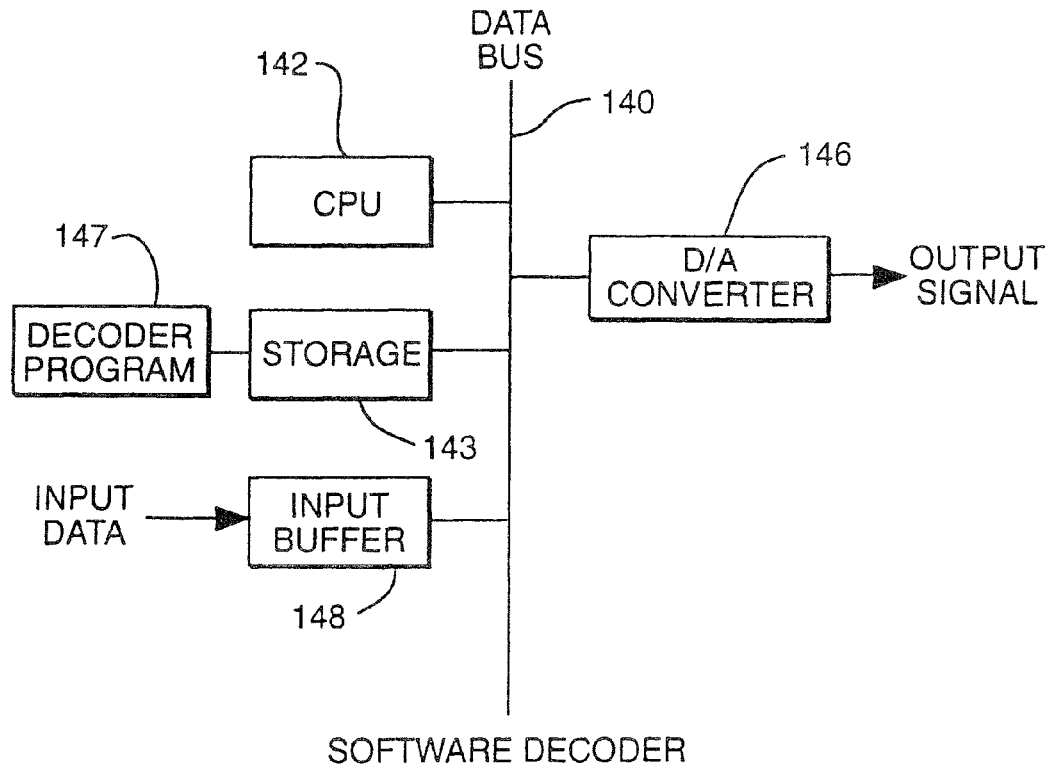
FIG. 15 is a diagram of a software decoder for a video decoding method according to the present invention.

FIGS. 14 and 15 are block diagrams of the components of the encoder and decoder of the invention for storing and executing software operating as disclosed in the flowcharts of FIGS. 10-13. The components in common for both diagrams have the same reference numbers and include the data bus 140, CPU 142 and storage device 143. The encoder program for executing the video encoding is shown in FIG. 14, and is stored in storage device 143. The decoder program for executing the video decoding is shown in FIG. 15, and is stored in storage device 143. Storage devices 143 are storage media, such as hard disk drives, floppy disks or optical disks, for example.

With reference to FIG. 14, an input video signal is A/D converted by A/D converter 141 and sent to CPU 142 over bus 140. CPU 142 retrieves and executes the encoder program 144 stored in storage device 143 and then encodes and compresses the video data received from the A/D converter 141. After the video data is encoded, it is stored in an output buffer 145 and output as output data. Control data and timing signals are also output with the compressed video data.

FIG. 15 shows the processing of coded video signal, which is received at input buffer 148 and then read by CPU 142. CPU 142, which retrieves the decoder program 147 from the storage device 143, executes the decoding of the coded video data. The decoded video data is then sent over bus 140 to D/A converter 146 for outputting an analog video signal.

Figure 1:
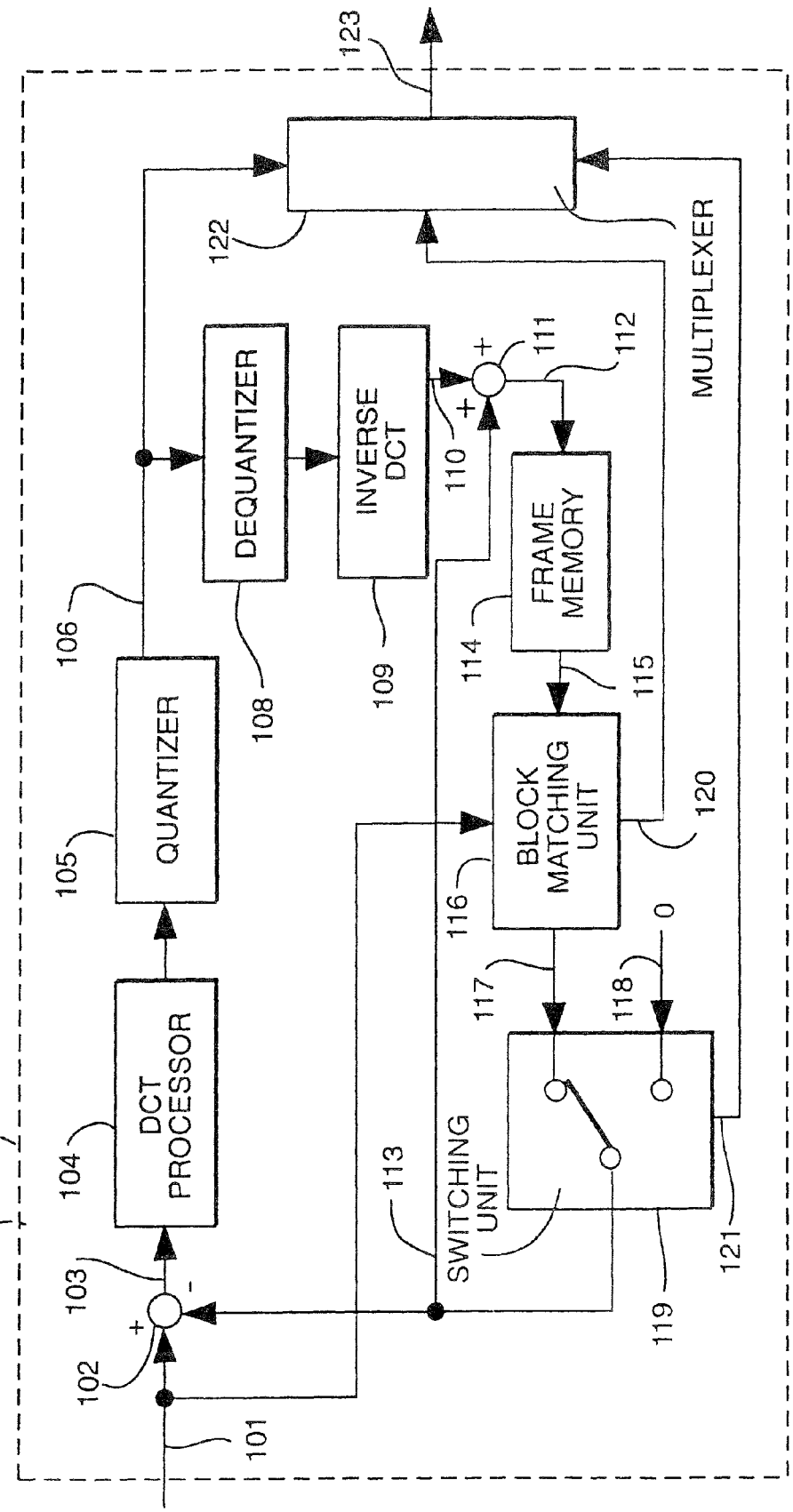
FIG. 1 is a diagram illustrating the constitution of an H.261 video coder.
Figure 16:
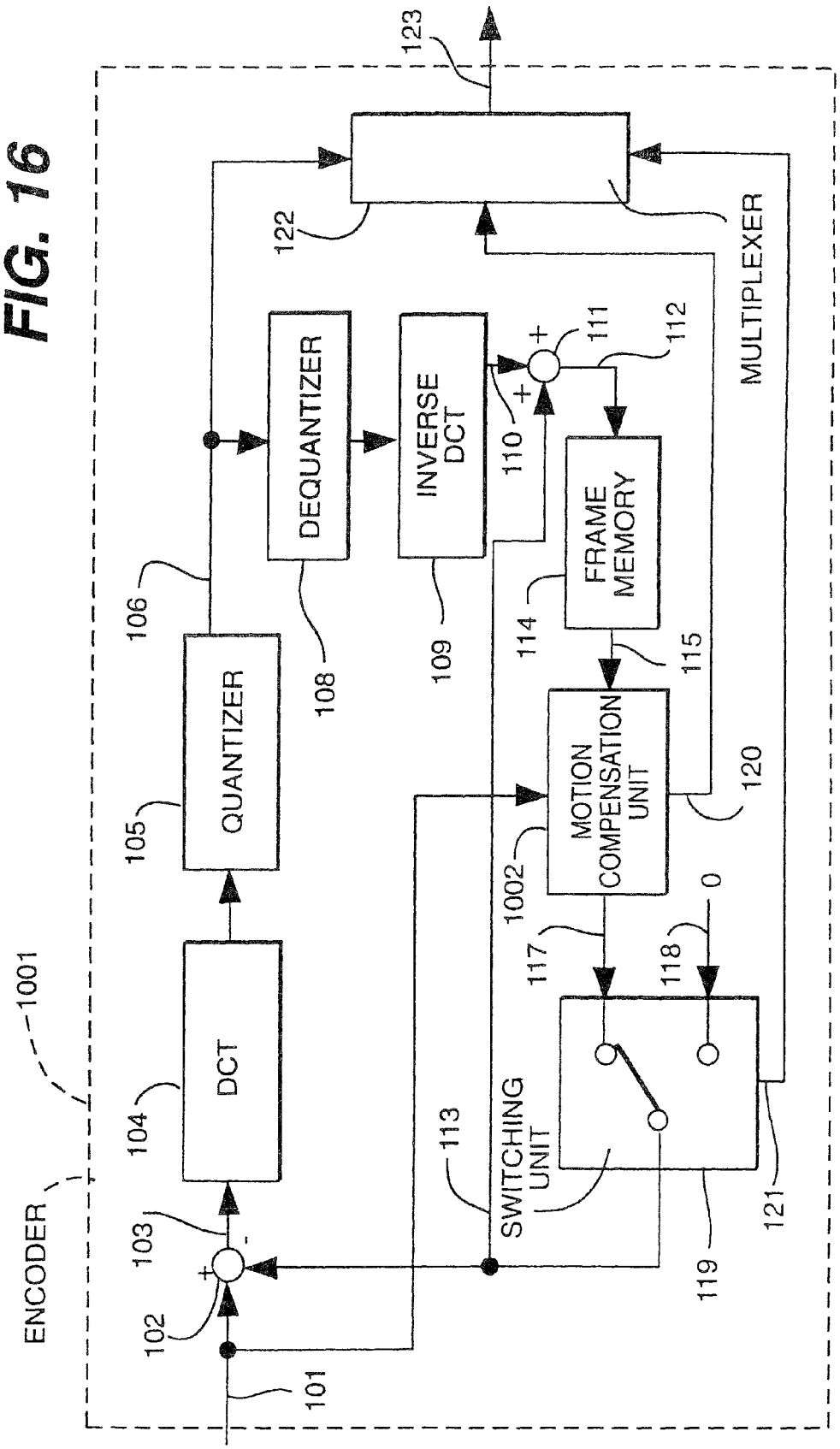
FIG. 16 is an overall diagram of a video encoder of the present invention.

FIG. 16 shows the overall block diagram of a video coder according to the invention that is similar to FIG. 1 of the prior art. Accordingly, the components in common for both diagrams have the same reference numbers. In the diagram of FIG. 16, block 116 of FIG. 1, which is a block matching unit for local motion compensation, is replaced with a block 1002 that uses global motion compensation and local motion compensation. Otherwise, the remaining components in the FIG. 16 diagram are the same as those in the diagram of FIG. 1.

Figure 17:
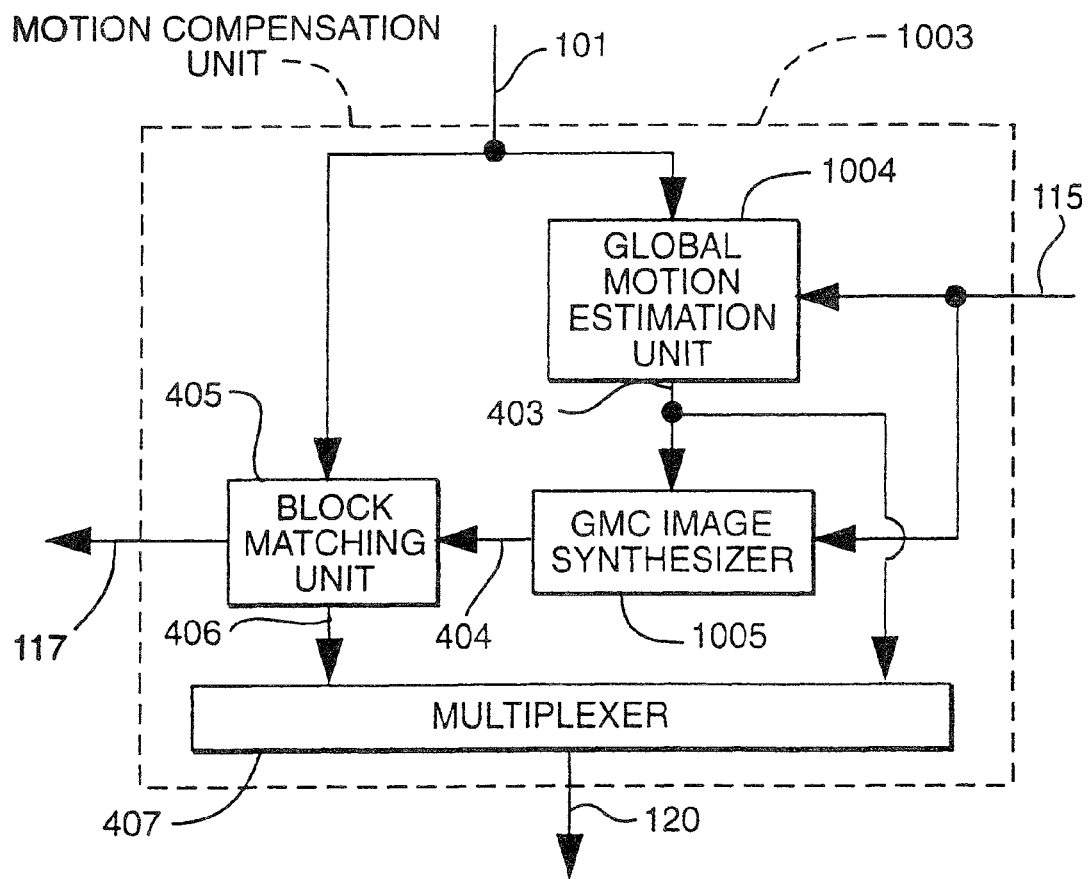
FIG. 17 is a diagram of a motion compensation unit used in the encoder of FIG. 16, according to one embodiment of the invention.

In FIG. 17, a motion estimation and compensation unit 1003 that performs serial processing is shown. Unit 1003 can be used as the motion estimation and compensation unit 1002 of FIG. 16. Further, unit 1003 is a hardware embodiment performing functions nearly equivalent to the steps performed in the software processing shown in FIG. 11.

As shown in FIG. 17, an input video signal 101 is received by the global motion estimation unit 1004 and also by the block matching unit 405. Global motion estimation is performed between an input image and the decoded image of a previous frame by the global motion estimation unit 1004. Unit 1004 also derives the motion vectors from the representative points of the input image. The data 403 related to these values is transmitted to the global motion compensation (GMC) image synthesizer 1005 which synthesizes the predicted image of the global motion compensation using the fast algorithm. A predicted image 404 of global motion compensation is then output to block matching unit 405 in which local motion estimation between the input image and the predicted image of global motion compensation is performed. Then, the motion vector data 406 is output to the multiplexer 407 and the predicted images of the present frame 117 is output to the adder 102 for synthesizing the error image by calculating the difference between the predicted image and the input image. The motion compensation unit shown in FIG. 17 uses serial global motion estimation and local motion estimation.

Figure 18:
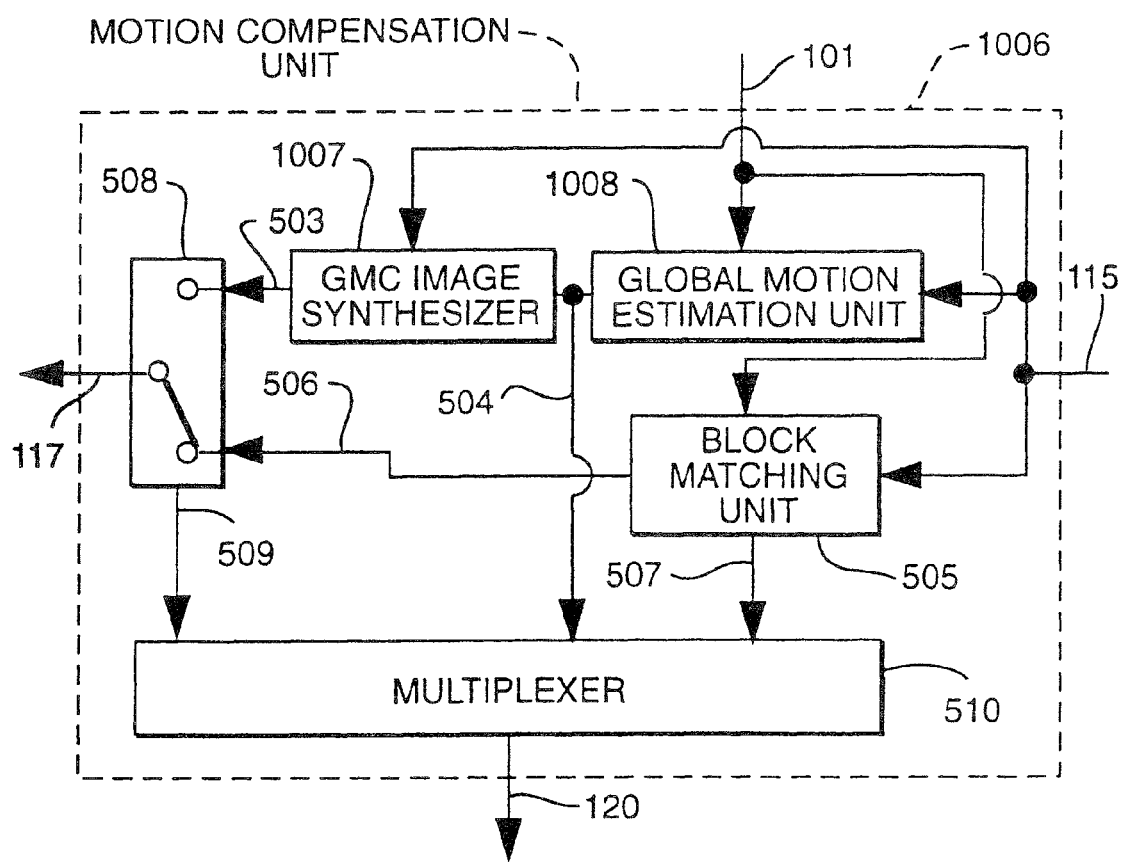
FIG. 18 is a diagram of a motion compensation unit used in the encoder of the invention shown in FIG. 16 according to another embodiment of the invention.

In FIG. 18, a motion compensation unit 1006 which can be used as the motion compensation unit 1002 in FIG. 16 is disclosed in which parallel processing is performed for the global motion estimation unit and the local motion estimation, as follows. First, a video signal 101 is input and received by both global motion estimation unit 1008 and block matching unit 505. Then, global motion estimation is performed between the input image and the decoded image of the previous frame by the global motion estimation unit 1008. The motion parameters 504, such as the motion vectors of representative points are input to the multiplexer 510 and the global motion compensation (GMC) image synthesizer 1007. A predicted image of global motion compensation using the fact algorithm is synthesized and output to a block matching/global motion compensation changeover switch 508 for outputting the predicted image of the present frame 117, obtained by one of global or local motion compensation for each block. The selection data 509 of the changeover switch selection is output to the multiplexer 510. The multiplexer also receives the output of 507 of block matching unit 505, which is the motion vector data. A signal 120 is output from the mutiplexer that includes signals 504, 507 and 509.

Figure 2:
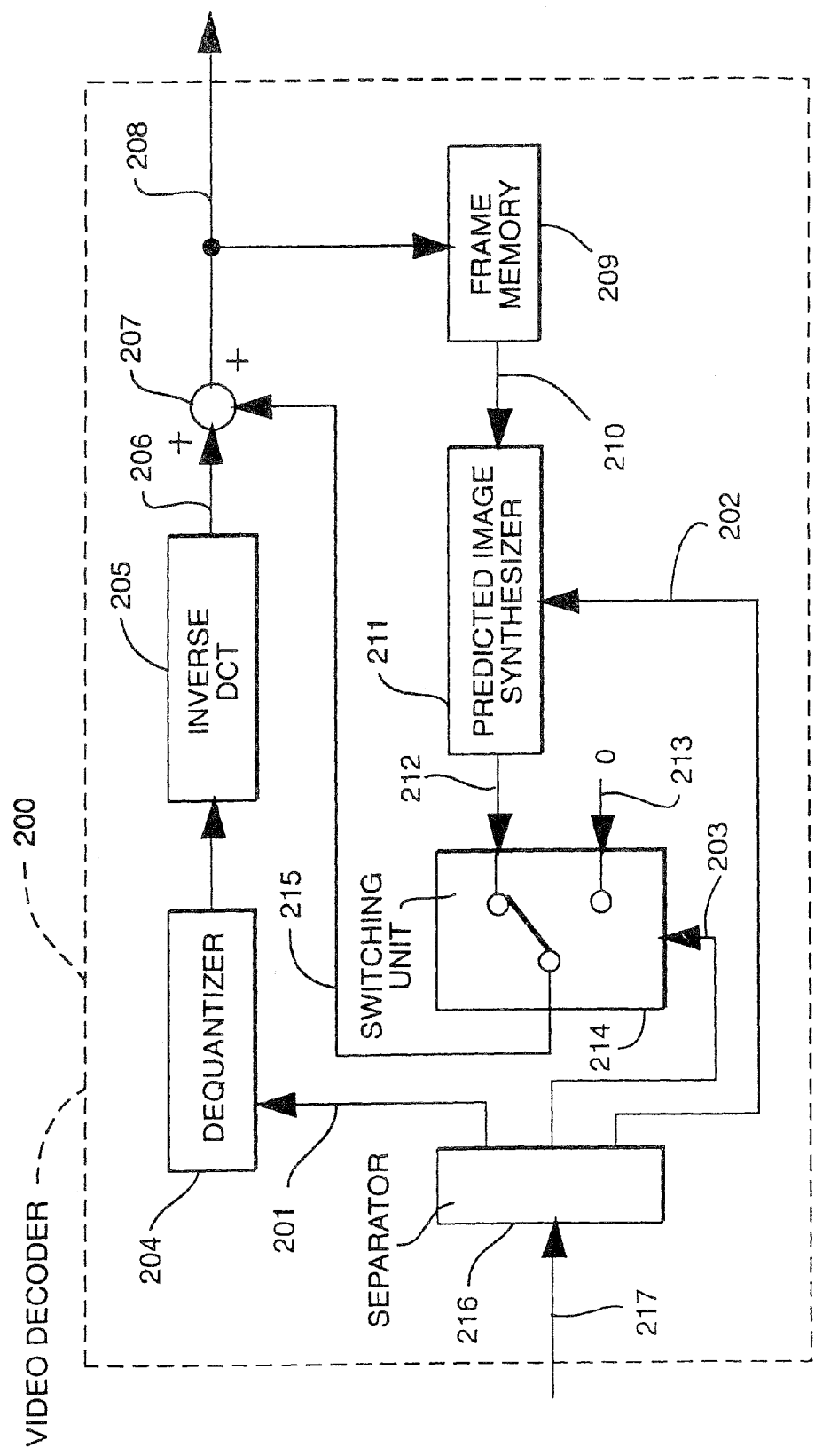
FIG. 2 is a diagram illustrating the constitution of an H.261 video decoder.
Figure 5:
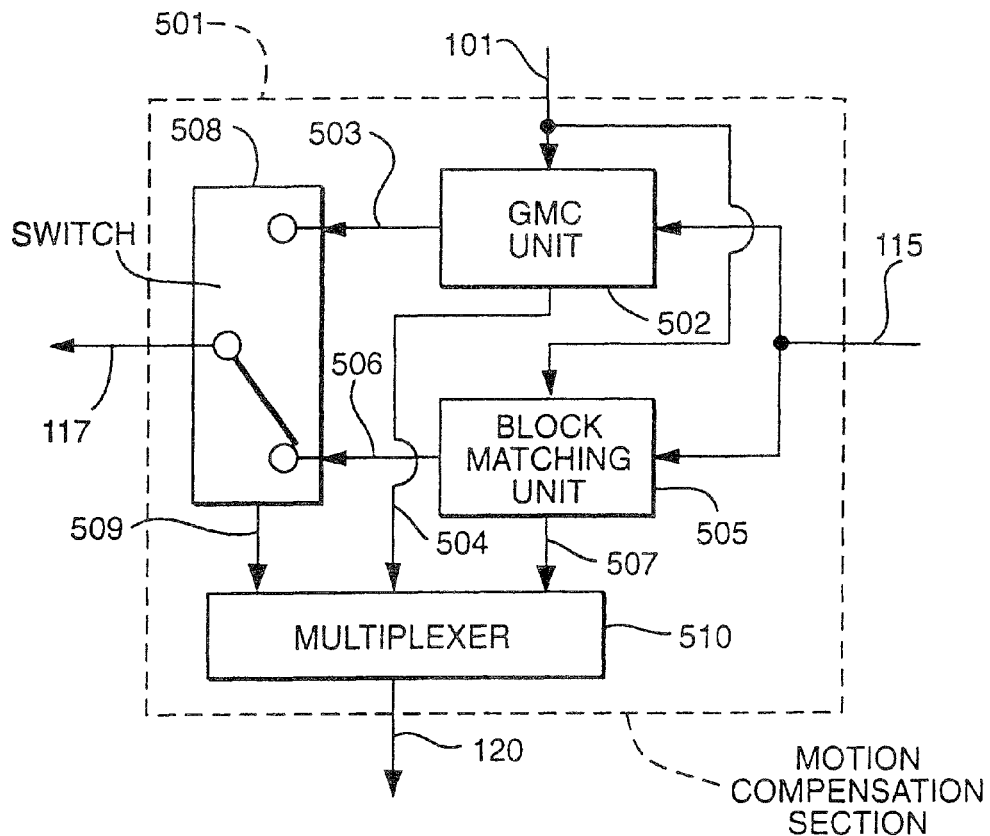
FIG. 5 is a diagram illustrating a motion compensation section of the video coder for selecting either the global motion compensation or the block matching for each of the blocks.
Figure 19:
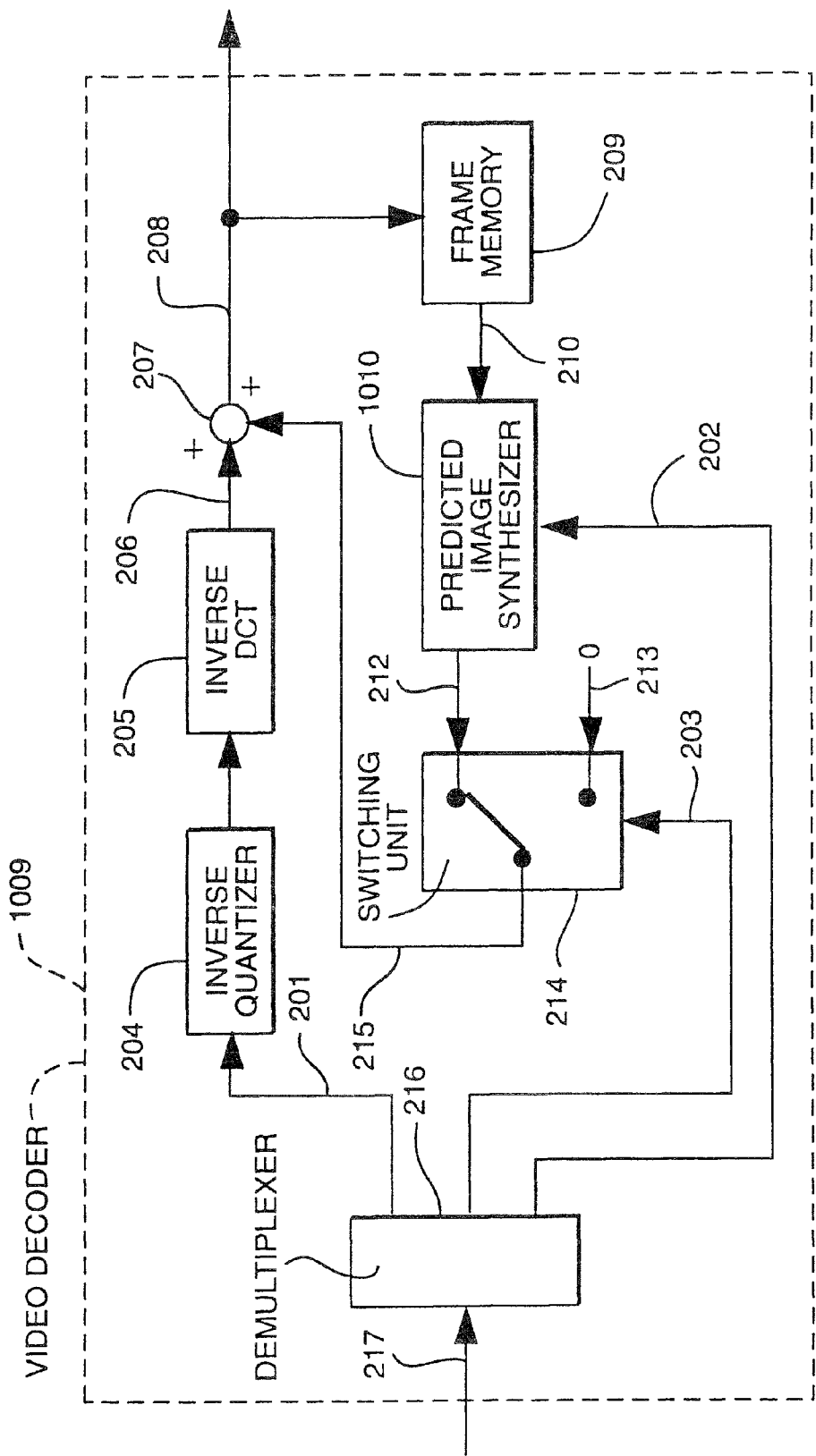
FIG. 19 is a diagram of a video decoder for decoding a video signal according to the present invention.

FIG. 19 shows a block diagram of a video decoder that is similar to the prior art decoder of FIG. 2, but that includes the addition of a predicted image synthesizer 1010 which synthesizes the predicted image in accordance with an embodiment of the present invention. Otherwise, the remaining components of the decoder 1009 are the same as shown in FIG. 2.

Figure 20:
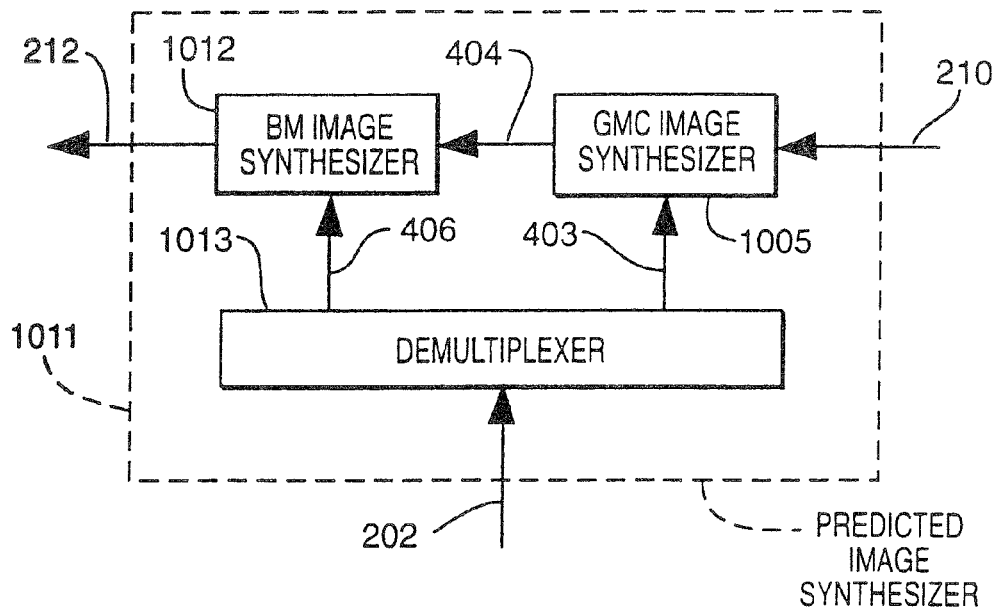
FIG. 20 is a diagram of a predicted image synthesizer used in the video decoder of FIG. 19 according to one embodiment of the invention.

In FIG. 20, a predicted image synthesizer according to one embodiment of the invention 1011 is shown, which can be used for the predicted image synthesizer 1010 shown in FIG. 19. Serial processing is shown in FIG. 20, in which the motion vector data 202 is received by the multiplexer 1013, which provides the motion parameters 403 and motion vector data 406 to the global motion compensation (GMC) image synthesizer 1005 and the block matching image synthesizer 1012, respectively. The GMC image synthesizer 1005 derives the motion vectors of representatives points and synthesizes a predicted image of global motion compensation using the fast algorithm. Then, it outputs the predicted image of global motion compensation 404 to the BM image synthesizer 1012, which synthesizes the predicted image of local motion compensation. The predicted image of the present frame 212 is then output to the switching unit 214, as shown in FIG. 19.

Figure 21:
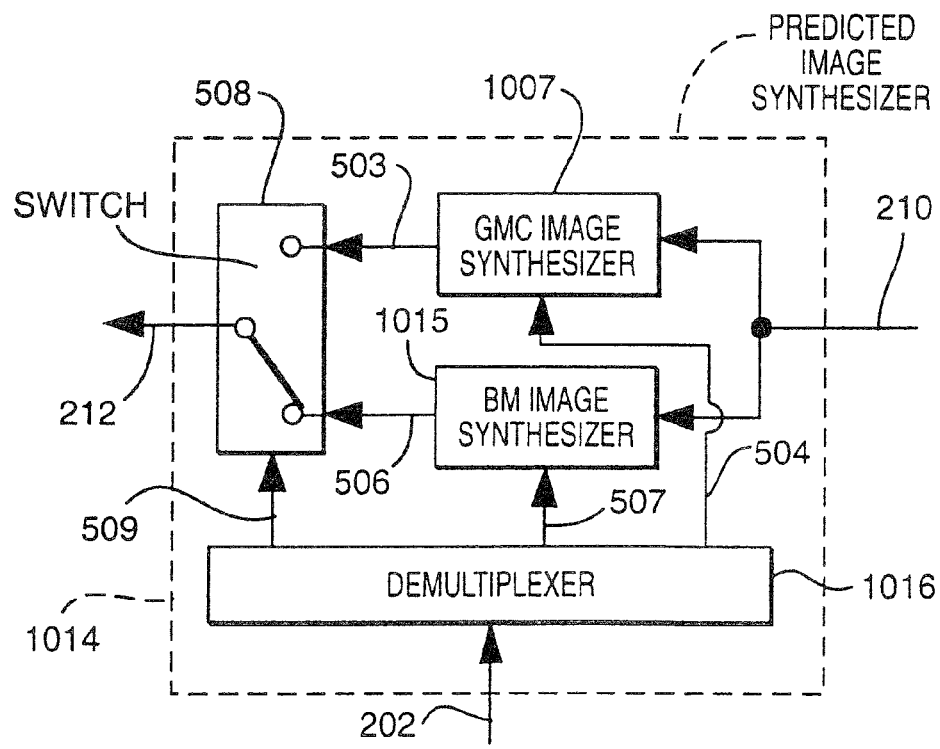
FIG. 21 is a diagram of a predicted image synthesizer used in the video decoder of FIG. 19 according to another embodiment of the present invention.

FIG. 21 shows a predicted image synthesizer 1014, which operates to process the global motion compensation image synthesizing and block matching image synthesizing in parallel, as follows.

The motion vector data 202 is input to the multiplexer 1016, which provides separated motion parameter data 504, motion vector data 507 and selection data of block matching/global motion compensation 509 to the GMC image synthesizer 1007, BM image synthesizer 1015 and switch 508, respectively, as shown. The BM image synthesizer 1015 synthesizes the predicted image for blocks which selected the local motion compensation and the GMC image synthesizer 1007 synthesizes the predicted image for blocks which selected the global motion compensation using the fast algorithm. The respective data 503 and 506 is output to the switch 508, which selects one of these signals according to the selection data 509, received from the demultiplexer. The predicted image of a present frame 212 is then output and received by switching unit 214, as shown in FIG. 19.

According to the embodiments of the invention, the video coding and decoding can be performed either by software operating as shown in the flowcharts of FIGS. 10-13 using the software encoder or software decoder shown in FIGS. 14 and 15 or by dedicated hardware, as shown in the embodiments of the invention in FIGS. 16-21.

I claim:

1. A method for decoding images comprising:
    a step for storing a reference image, which is a decoded image of a previously decoded frame;
    a step for calculating a motion vector of each pixel in a predicted image of a current frame by using motion vectors or representative points having coordinates (i, j), (i+p, j), (i, j+q), where i and j are integers, and p and q are powers of integers of 2; and
    a step for synthesizing said predicted image by using said motion vector of each pixel and said reference image, wherein:
    the horizontal and vertical components of said motion vector of each pixel are integral multiples of $1/m$;
    the horizontal and vertical components of said motion vectors of representative points are integral multiples of $1/k$; and
    said motion vector of each pixel is calculated according to equations:

$$u(x,y)=((u0pq+(u1-u0)(x-i)q+(u2-u0)(y-j)p)m)//(pqk),$$

$$v(x,y)((v0pq+(v1-v0)(x-i)q+(v2-v0)(y-j)p)m)//(pqk),$$

where $(u,(x, y), v(x, y))$ is m times of a motion vector of a pixel having coordinates $(x, y)$, $(u0, v0)$, $(u1, v1)$, and $(u2, v2)$ are k times of said motion vectors of said representative points $(i, j)$, $(i+p, j)$, and $(i, j+q)$ respectively, m and k are powers of integers of 2, "//" represents integer division that rounds the quotient of ordinary division into an adjacent integer when the quotient of ordinary division is not an integer, and its priority as an operator is the same as that of ordinary multiplication and division, and $u(x,y)$, $v(x,y)$, u0, v0, u1, v1, u2 and v2 are integers.

2. A method for decoding images according to claim 1, wherein said "//" rounds a quotient of ordinary division of which the value is the sum of an integer and $^{1/2}$ toward 0 when the dividend is negative, and away from 0 when the dividend is positive.

\* \* \* \* \*